US009606970B2

(12) United States Patent
Pappas et al.

(10) Patent No.: US 9,606,970 B2
(45) Date of Patent: Mar. 28, 2017

(54) WEB BROWSER DEVICE FOR STRUCTURED DATA EXTRACTION AND SHARING VIA A SOCIAL NETWORK

(71) Applicants: Derek Edwin Pappas, Palo Alto, CA (US); Dragan Vujovic, Belgrade (RS)

(72) Inventors: Derek Edwin Pappas, Palo Alto, CA (US); Dragan Vujovic, Belgrade (RS)

(73) Assignee: Data Record Science, Cheyenne, WY (US)

( * ) Notice: Subject to any disclaimer, the term of this patent is extended or adjusted under 35 U.S.C. 154(b) by 809 days.

(21) Appl. No.: 13/734,916

(22) Filed: Jan. 4, 2013

(65) Prior Publication Data

US 2013/0191723 A1 Jul. 25, 2013

Related U.S. Application Data

(60) Provisional application No. 61/583,556, filed on Jan. 5, 2012, provisional application No. 61/636,910, filed on Apr. 23, 2012.

(51) Int. Cl.

*G06F 17/00* (2006.01)
*G06F 17/22* (2006.01)
*G06F 17/30* (2006.01)

(52) U.S. Cl.

CPC .... *G06F 17/2247* (2013.01); *G06F 17/30917* (2013.01); *G06F 17/3089* (2013.01)

(58) Field of Classification Search

CPC ............................ G06Q 30/06; G06F 17/3089
See application file for complete search history.

(56) References Cited

U.S. PATENT DOCUMENTS

2008/0126022 A1* 5/2008 Hoguet ............... G06F 17/5004 703/1
2010/0083095 A1* 4/2010 Nikovski .......... G06F 17/30896 715/234

* cited by examiner

*Primary Examiner* — Shawn S Joseph

(57) ABSTRACT

A method and system for implementing a browser based information extraction and transmission method. A method and system for identifying, extracting, and transmitting predefined structured information from web pages browser interface. The extracted information is then added to a user profile on a social network and a database. The information is shared with other users who can comment, copy, vote on, or go to the original information source. The information can be combined with other extracted information to form collections for the purposes of voting on one or more items in the collection, combining multiple items to form a useful kit, saving information for later use, adding addition information such as dates and purchase location for personal inventory purposes, and for saving bookmarks to structured data.

23 Claims, 17 Drawing Sheets

201

GroupAngle°

| Data | More data | Specs | Help |

Product name:

Product image:

Price:      $ USD ▼

☐ Notify me of price changes for this product

[Submit] [Find] [Cancel]

---

202

GroupAngle°

| Data | More data | Specs | Help |

Add more images

Sale price

Model number:

Category:

Rating:

Description

Manufacturer name:

Manufacturer logo:

Retailer name:

Retailer logo:

UPC

[Submit] [Find] [Cancel]

---

203

GroupAngle°

| Data | More data | Specs | Help |

Specifications are in beta. Select both first and second field or just the third.
Spec name Spec value Spec Features Colors

[Submit] [Find] [Cancel]

---

204

GroupAngle°

| Data | More data | Specs | Help |

Populate the panel with the information from the page by right-clicking on the page elements and selecting the corresponding field name from the context menu.

See more help pages of the Group Angle site.

[Submit] [Find] [Cancel]

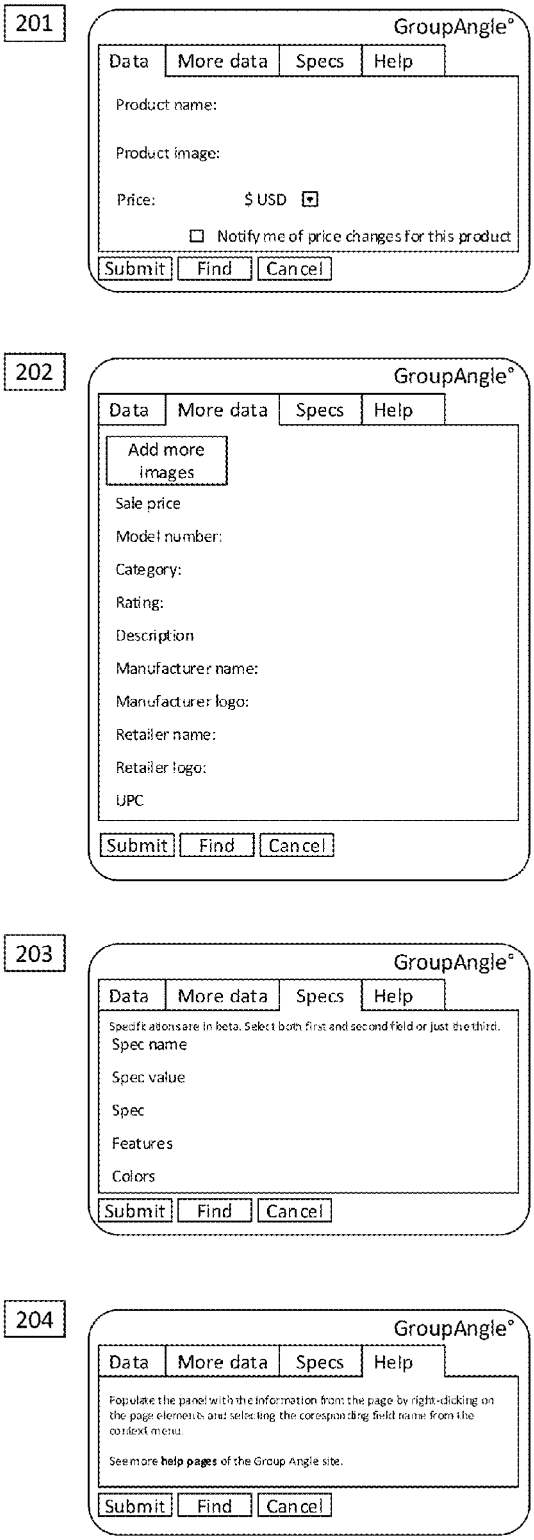

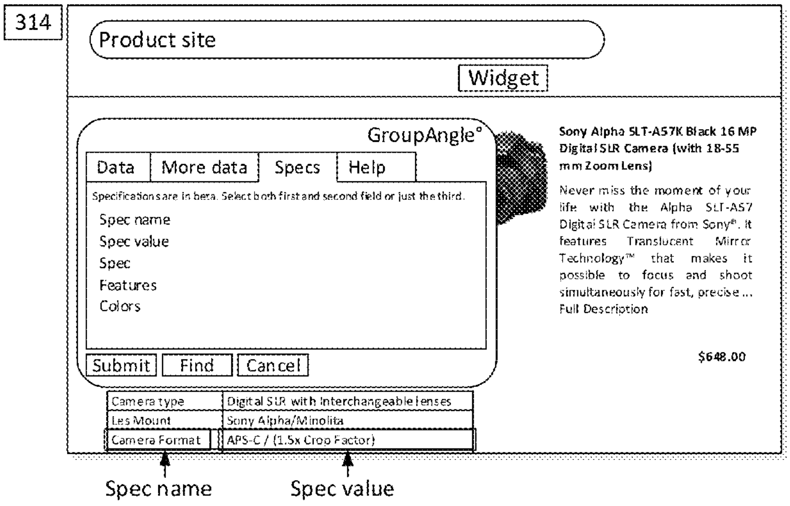
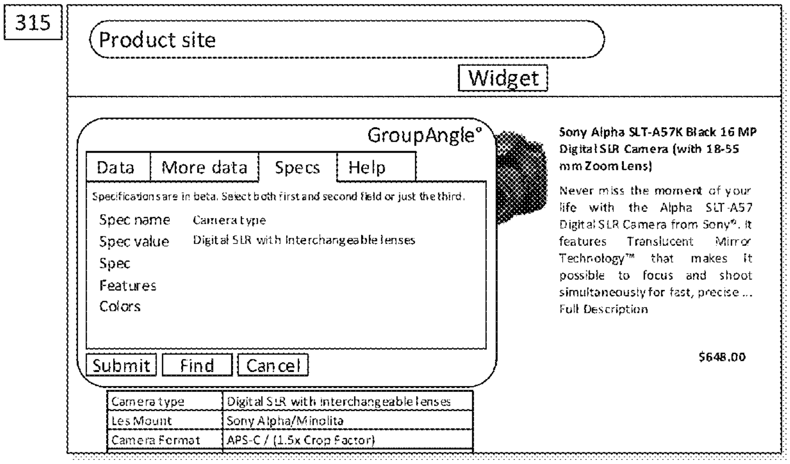
FIG. 3c
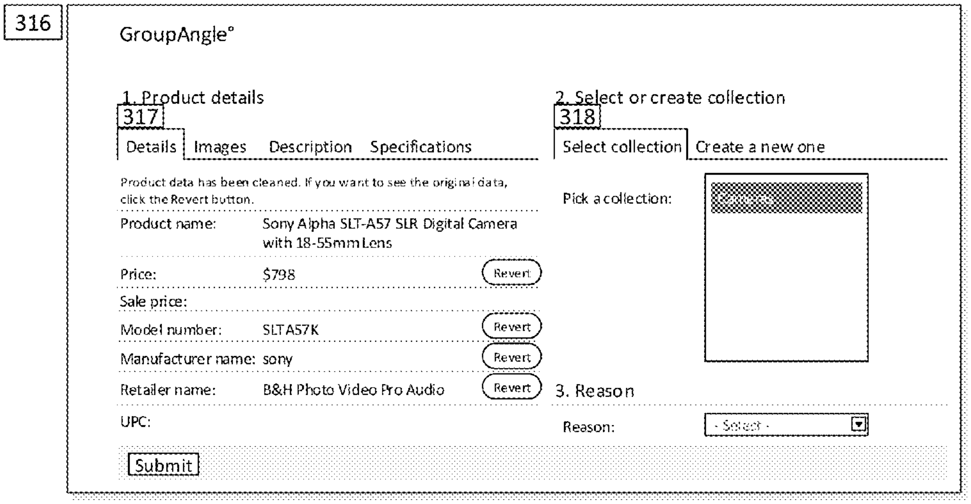

WEB BROWSER DEVICE FOR STRUCTURED DATA EXTRACTION AND SHARING VIA A SOCIAL NETWORK

CROSS-REFERENCE TO RELATED APPLICATIONS

The present application claims the benefit of U.S. Provisional Application No. 61/583,556, filed Jan. 5, 2012, by Derek Edwin Pappas and titled "Structured Data Extraction and Sharing Via a Social Network" and U.S. Provisional Application No. 61/636,910, filed Apr. 23, 2012, by Derek Edwin Pappas and Dragan Vujovic and titled "Web Browser Device For Structured Data Extraction and Sharing Via a Social Network", included by reference herein and for which benefit of the priority dates are hereby claimed.

FEDERALLY SPONSORED RESEARCH

Not applicable.

SEQUENCE LISTING OR PROGRAM

Not applicable.

FIELD OF INVENTION

The present invention relates to Internet data search and information extraction technologies and social networks.

BACKGROUND

Current socially curated networks contain information which is unstructured and often does not contain the metadata associated with the images that users have uploaded or captured from another website using a widget or extension. These types of socially curated websites contain unstructured data which makes it difficult to index, search, and compare different items on the social network. Search results on product search engines typically include duplicate products from different retailers. Product search engine results do not typically include manufacturer records, which normally contain the most complete set of product attributes, including specifications. Thus, it is difficult to compare different products even if they can be found on the aggregated web site, since the detailed product information is missing. Shopping engines typically contain relatively little information about the products in their search results. A formal definition of information retrieval is finding documents, which are typically unstructured text, that match a query, from a large body of documents that are indexes. The current search process for products at shopping engines, retailers, manufacturers, and socially curated product sites is not as efficient as it can be.

Users save data from product web pages using widgets, buttons or browser extensions from socially curated sites such as Wanelo, Pinterest and Clipix. Socially curated sites allow users to save a title and select a picture to save, and select a price to save on a page to their list. However, socially curated sites do not create a template for the data record, nor extract the data record, nor transmit, nor store the entire data record from the remote web page. Because the socially curated web site does not receive the entire data record, no cleaning, classification or normalization actions are performed. Currently, socially curated sites do not do semantic analysis of the text that is extracted from the remote web site to create data records that are displayed on the user's collection. The one data value that they may extract automatically is the price nearest the product image. They do not extract complete information from web pages and associate semantically analyzed text with data field names and store the information in data records. An example of text which has semantic meaning is a token(s) of alphabetic characters that represent a manufacturer name. Consequently, there is a need for semantic analysis after the text that is associated with a data field name is extracted from the page.

Unstructured data is contained on socially curated networks that was captured on remote sites and saved to user collections. "Unstructured data" in the case of product records means that the data is not organized into name/value pairs such as "price" and "$10". Sites such as Pinterest, Wanelo, and Shopcade extract the title of the page, search for an image near the top of the page or let the user select the image, and search for a price near the selected image. They send the extracted record to their popup, the user selects a collection to add the data to, and the record is then added to the collection. These socially curated sites do not have a pre-defined template nor do they make a template for the product sites. As a consequence a robot or user cannot revisit the site and extract the full product record from the sites using a previously created template and create a product database on their respective sites. Structured data is typically stored in relational databases or some other form of table structure that may be hierarchical and have relationships between tables. Structured data in web pages has a structure that is structurally repetitive in nature from document to document. The structure can be represented with a template. Structured databases are used to generate product pages at manufacturer and retailer websites. The product pages contain most or all of the same information as the product record in the database. The product web page is generated with a template. The product record is embedded in a markup structure (HTML) in each web page. The structure which holds the product record may vary slightly from page to page due to differences such as the presence of a sale price on one page and no sale price on another or variable numbers of specifications from page to page or advertisements. Capturing the product record on any web page at the same site is a matter of knowing the layout of the structure that contains the product record. A template which contains XPATHs and semantic information (the data field name) has been used in solutions to capture and save web based information for the purposes of analyzing the information, using the information in reports, and other purposes.

Other social networks that utilize buttons on remote web sites to capture information from the web page normally send links or small amounts of data from the remote page via Facebook like or Twitter Tweet buttons (shortened urls) from sites to their respective destinations, Facebook or Twitter. It would be beneficial to send complete data records from sites using 3$^{rd}$ party predefined set of data field names and the corresponding data field values from pages at sites for the purpose of creating user curated data. There is also a need for systems that transmits the data records, cleans the data records, classifies the data records, normalizes the data records, stores the data records in a database and displays the data records on a socially curated site.

Users on Twitter and Facebook tweet and post messages about brands and products. The messages can be classified by different types such as customer service, product durability. Two or more product records can be compared by the user in the social shopping network. The comparison can be saved to the user's list of product comparisons. The comparison process may require that the user normalize the data field names or the specification attribute names.

The Document Object Model (DOM) is a cross-platform and language-independent convention for representing and interacting with objects in HTML, XHTML and XML documents. Objects in the DOM tree may be addressed and manipulated by using methods on the objects. The public interface of a DOM is specified in its application programming interface (API). The HTML DOM defines a standard way for accessing and manipulating HTML documents. The HTML structure is represented as a tree.

When a page is loaded into a browser, the browser domain object model (DOM) is constructed. The DOM is a tree-like representation of the HTML hierarchy, attributes, visible text, and other information in the HTML page. FIG. 1 shows an example HTML tree. On top is the HTML tree document 101, under is the root element 102, the head element 103, the title element 104, the text associated with the title 105, the body element 106, and the href attribute 107. The <a> element 108 contains text associated with the link 110. Element <h1> 109 contains text associated with header.

The web site templates used for generating the web pages that contain product records are created by one person and are typically not downloaded from a central source. Content management systems which are sold or downloaded contain templates that are customized by the web designer responsible for the creation of the website. Different sites may use the same content management system. However, the resulting HTML on two sites using the same content management system and templates are not necessarily the same. Moreover, it is not really possible to know that two web sites have used the same content management system and templates. Online shopping site generators offer stores different templates to use to generate their stores. Again, it is not possible to know what template was used to generate the store front, and the store front can be customized, which leads to differences between two different store fronts that were generated from the same template. However, it would be beneficial to have a system which uses crowd sourced web page data record template creation to build a database of web page templates which could then be used by others to extract the information from the web pages at the site where the template(s) were created, and to save the information to a social network. Moreover, there is a need for a crowd based web page data record template creation and storage system that could be used to create templates for batch extraction of information from remote web sites. Furthermore, there is a need for a system that uses the data record information extracted from the web page to find the same or similar products at other web sites in a central product record data base that is created with the previously mentioned batch extraction system.

Search engines index words and phrases. Attempts to extract structured data in web pages have been made by search engines using special markup in the web pages such as micro formats. The web designer inserts the micro formats to identify the data records in the web pages. The search engine crawls the site and examines the pages for the presence of micro formats. The micro formats identify the data field values using a set of data field names. The micro formatted data is extracted into a data structure which is then inserted into a database or data table. The database or data table can then be further indexed to provide better search results for end users. Identifying product pages with fine grained searches that contain detailed information is then possible. However, web masters have not embraced micro formats and only a small percentage of the web sites are currently using micro formats or any of the other industry standard structured data formats designed to assist conventional search engines in extracting structured data. The structured data formats are not being inserted into the pages.

The information may be combined by inserting it into a spreadsheet and manually normalizing the data to produce a report. XPath, the XML Path Language, is a query language for selecting nodes from an XML document. In addition, XPath may be used to compute values (e.g., strings, numbers, or boolean values) from the content of an XML document. XPath was defined by the World Wide Web Consortium (W3C). Tag pairs in an HTML product page contains text. The text can be product record data field names and values. The XPATH and data field name and value is created from a template and a data record.

Kapow has web data extraction capabilities for a single web site using wrapper technology. They also have data normalization and data transformation capabilities including text and code strings, numbers, date and time, HTML/XML.

Fetch.com compares pairs of pages using algorithmic “experts” (e.g. computer algorithms) to find similarities between the pages, forms clusters out of matching pairs, extracts the data from the clusters and stores the data in the data base. (Publication number EP1910918 A2).

SUMMARY OF THE INVENTION

In accordance with the present invention, there is provided a method and system for the creation of templates, extraction of product records using the templates, categorization of the product data in the product record, normalization of the data field names and values in the product record, indexing, and tracking items of interest on the web. In addition, the product record information can be curated and integrated with the user’s social graph. The information and template represent the structure and content of the data record information on the web page. The extraction template database stores the templates which are used by the external extraction button and the extraction system which extract data records from remote web pages and sends them to the search engine. The system provides significant advantages over current socially curated sites, shopping engines, and conventional search engines which typically index unstructured text from web pages or use data feeds. The creation of a central data record database by the present invention allows users at a web site to search for products efficiently. The normalized database allows users to compare products at a very detailed level using the specifications. The extraction, classification, and normalization of structured data, which are the data field values in the data records in the web page, creates structures which can be searched in the similar way that a conventional database is searched. The structured data can be compared, and analyzed unlike unstructured data which is indexed by a search engine such as Google.

BRIEF DESCRIPTION OF THE DRAWINGS

A complete understanding of the present invention may be obtained by reference to the accompanying drawings, when considered in conjunction with the subsequent, detailed description, in which:

FIG. 2*a*-2*d* are wireframe diagrams of a web browser device.

FIG. 3*a*-3*d* are wireframe diagrams showing details of a web browser device.

DETAILED DESCRIPTION

Figure 1:
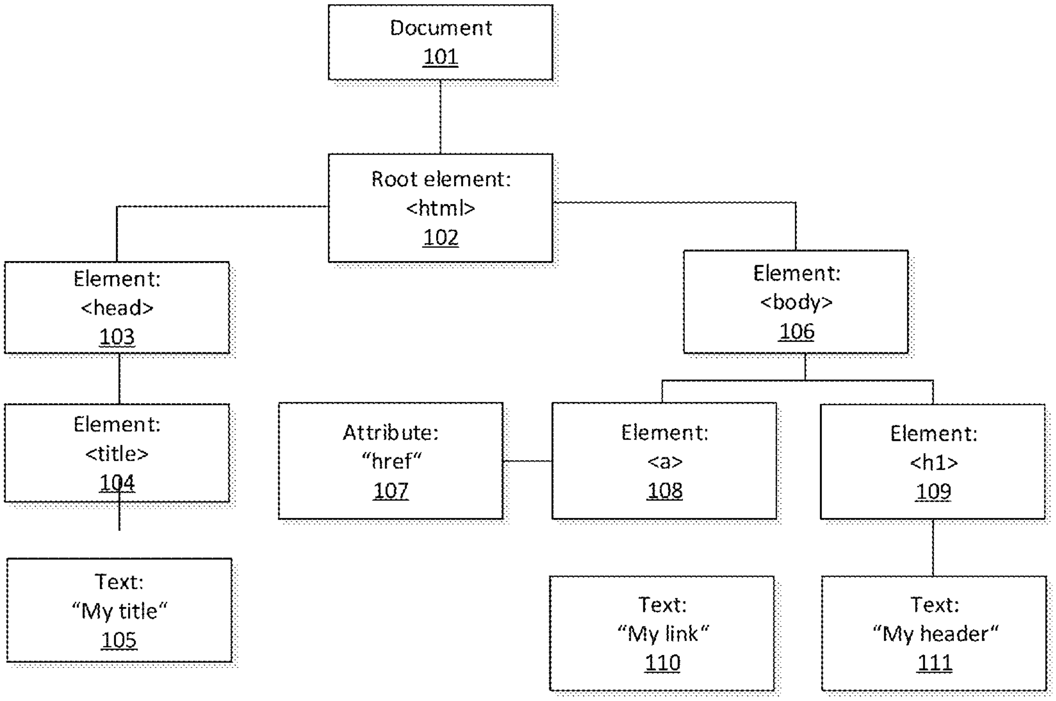
FIG. 1 is a block diagram of an HTML Tree.

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms “a”, “an”, and “the” include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

In one embodiment of the present invention, a user identifies the structured data in the page, associating data field names with the data field values. Alternatively, the web master adds a hidden data field which can be extracted using an embedded button.

The template is then used to automatically extract the data from all pages at the site that have the same page structure as the page that the template was created from. Variations in page layout are handled by the automatic extraction engine. Search results containing structured data (data records) are presented to the user. Structured data records extracted from one page can be indexed. Faceted search can be used in the conjunction with the index to specify fine grained requirements for a search. This has significant advantages over searching unstructured text.

The user can visit pages with structured information and click on the web browser device button embedded on the HTML page.

The web browser device is opened either by clicking on the web browser device button on the browser toolbar or extension or by clicking on the web browser device button embedded on the remote HTML page. Widget panel (FIG. 2) contains tabs, each of which contains data fields.

Turning now to FIG. 2*a*, the first tab visible after opening the web browser device is the “Data” tab 201 which contains the product name, product image and price field. It also contains a pull-down menu to select the currency if it is not detected automatically. In addition there is a check box to set an alert which user will receive if the price changes or some other price alert criteria is triggered. The second “More Data” tab 202 shows additional data fields which include the sale price, model number, category, rating, description, manufacturer name, manufacturer logo, retailer name, retailer logo, UPC and a button to upload additional product images. The “Specs” tab 203 contains the selected specification name/value pair, the specification, feature, and/or color data fields. The fields in the “Specs tab” contain a single instance of a specification name/value pair, feature, or color. The cleaner will extract the additional instances of the specification name/value pairs, features, and/or colors from the page using the repeating pattern extraction engine. The last tab is a “Help” tab 204 with brief instructions on how to use the widget, a popup help video, and a link to the page on the web site with more detailed explanation. A user prompting system which guides the user through the creation of a new widget template by identification of data field names, specifications, features, and colors is designed to assist new users in the creation of templates. Submit, find and cancel buttons are available on each tab. If the user clicks on the “Submit” button a popup will appear.

Figure 2B:
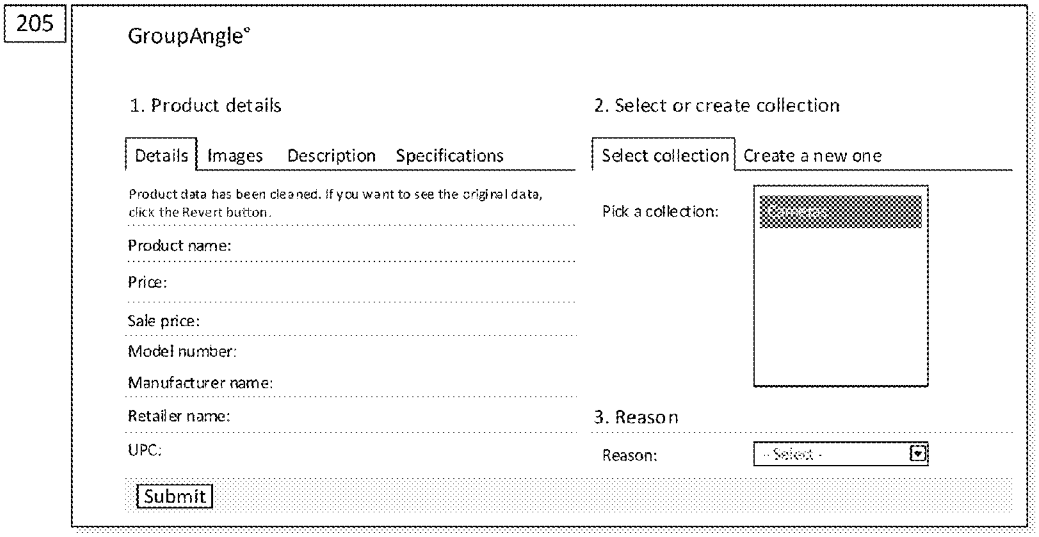
Figure 2B:
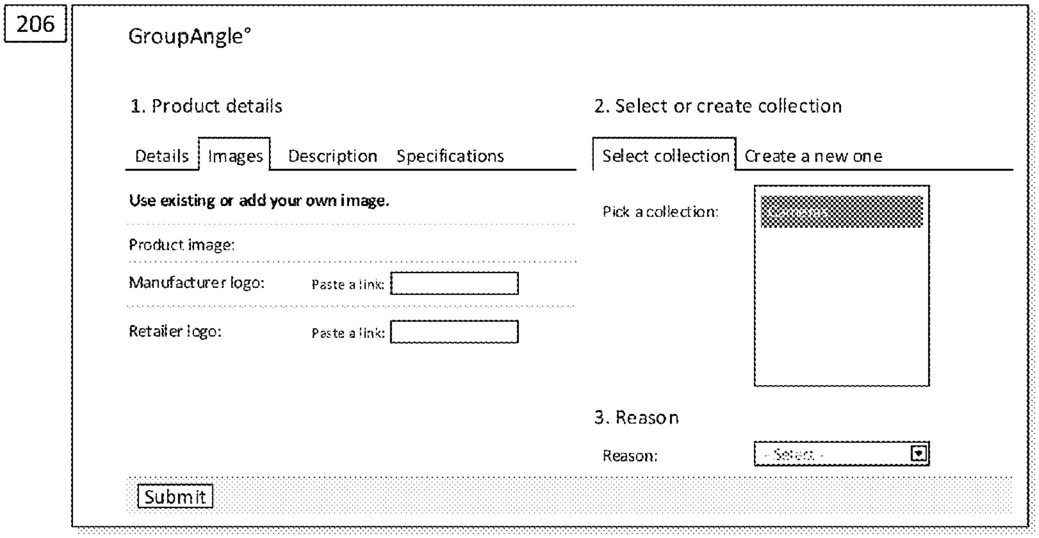
Figure 2C:
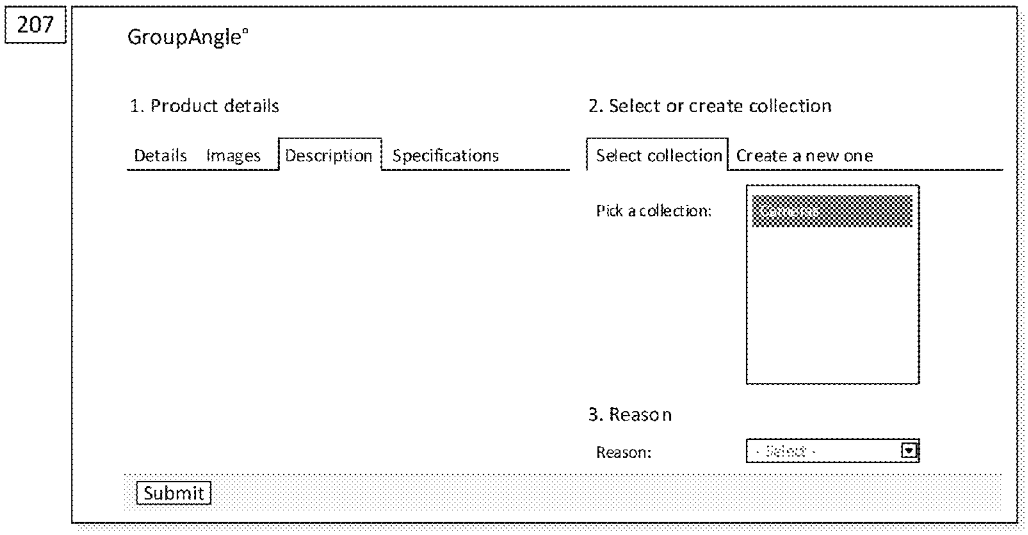
Figure 2C:
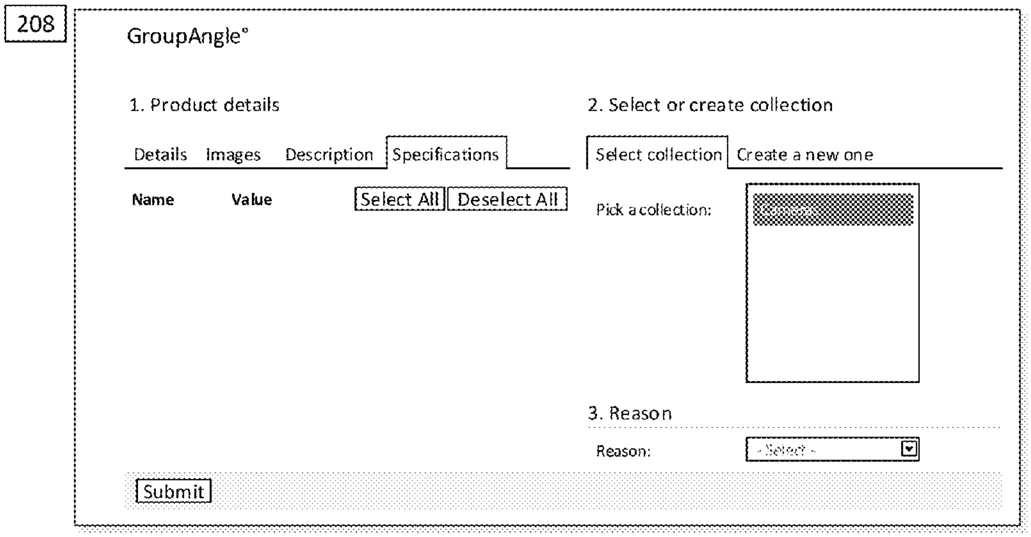
Figure 2D:
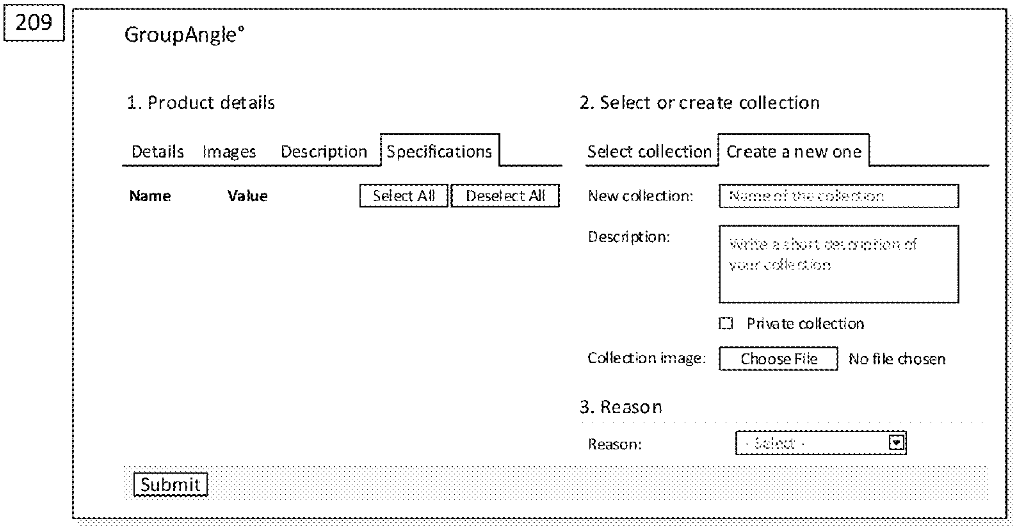
Figure 2D:
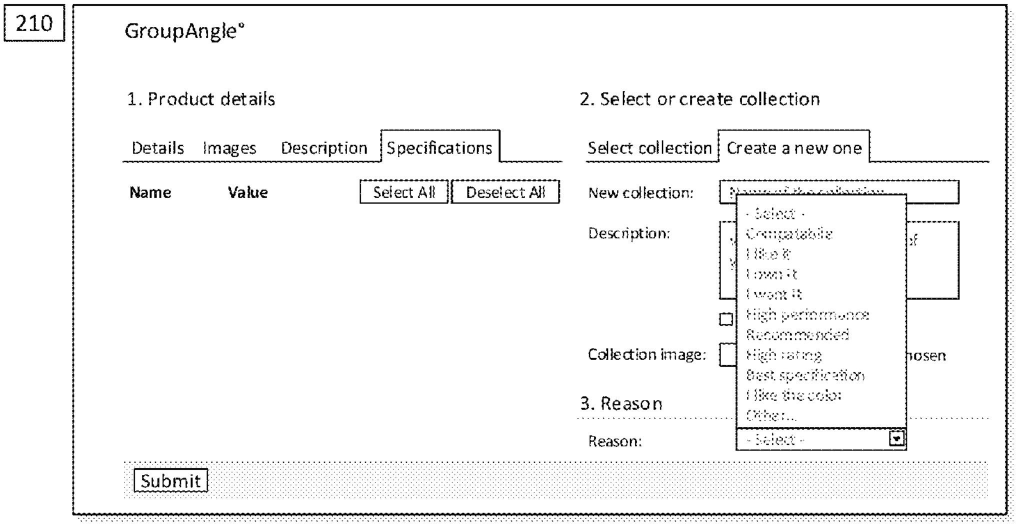

Turning now to FIG. 2*b*, the popup 205 contains product details tabs, two collection related tabs and a pull-down menu to select a reason of adding an item. The “Images tab” contains the extracted product image, retailer and manufacturer logos, and additional images. In the “Images” tab 206 user can optionally paste the URL of a manufacturer and/or retailer logo. Turning now to FIG. 2*c*, the “Description” tab 207 contains the description extracted from the remote URL. The specifications tab 208 gives the user the option to select which specification fields and values will be submitted using check boxes. Turning now to FIG. 2*d*, the “Create a new” tab 209 contains fields necessary for creating a new collection, like collection name, collection description, a button to upload the collection’s default image and a check box for saving a collection as private. The pull-down menu 210 shows predefined reasons for adding an item to a collection. User can select only one of the offered choices or can define his own reason by selecting “other” from the menu and typing it in the text box. Clicking on the “Submit” button will send the product information to the website.

Figure 3A:
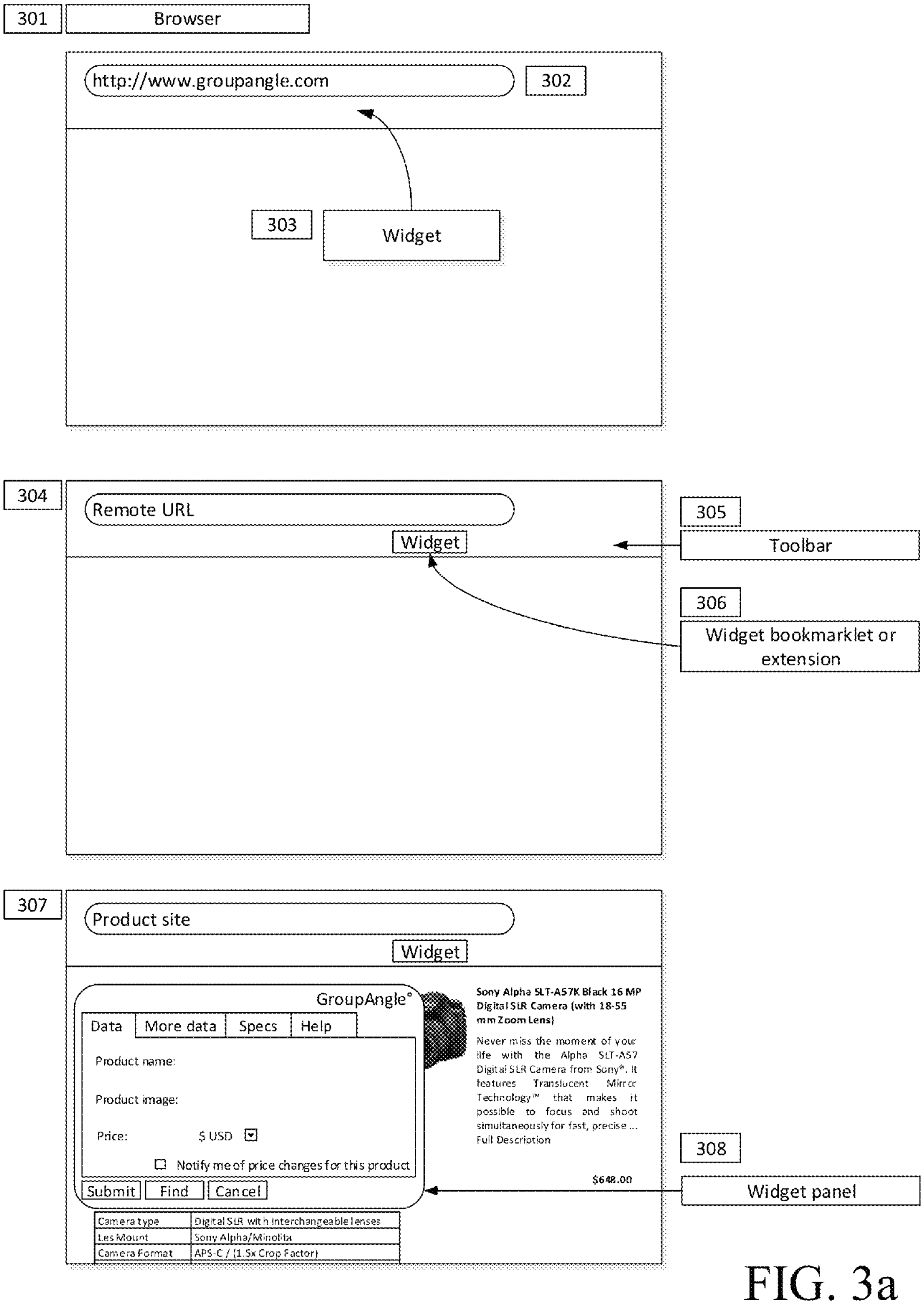
Figure 3B:
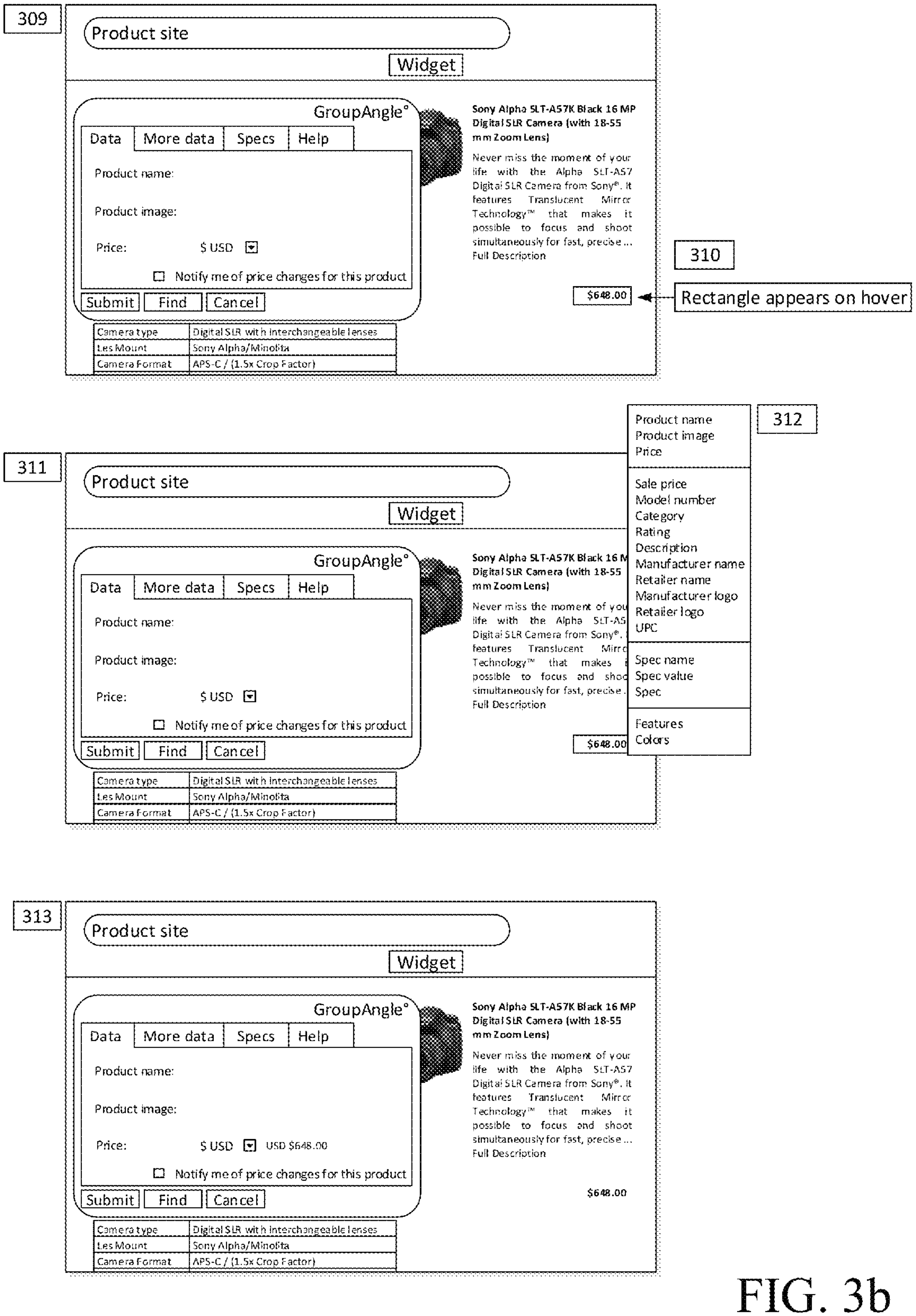
Figure 3D:
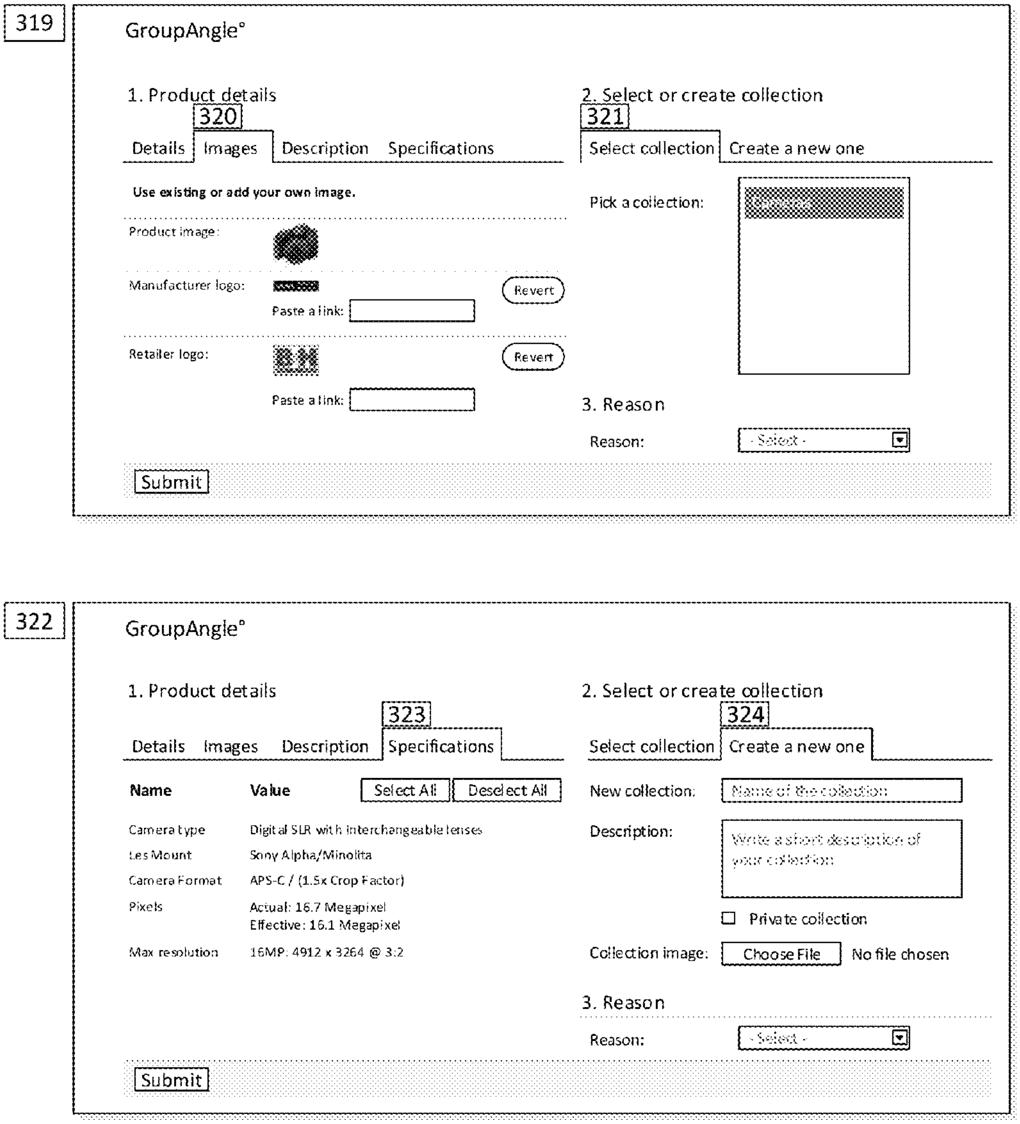

Turning now to FIG. 3*a*, in order to add external products to a collection a user needs to install widget bookmarklet 303 on it’s local browser 301. Widget installation button is found on the website’s home page 302. A user can add an external product to a collection by opening up another web browser tab and typing in a retailer’s site (e.g. Best Buy) URL 304. The user then navigates to a single product page of interest on the retailer site 307. Then, if the widget or the extension are installed, user clicks on the bookmarklet button 306 on the browser toolbar 305. The widget panel appears 308. Turning now to FIG. 3*b*, if the panel is empty 309 then the user adds the data field name/data field value pairs to the panel 313 by hovering over a data element where a rectangle 310 will appear around the contents of an HTML tag pair right clicking on the data elements in the web page 311 that belong to the structured data record embedded in the web page and selecting the corresponding field in the right click menu 312. The user is creating a template which will be used to extract pages generated from the same remote web site template at the remote web site. Turning now to FIG. 3*c*, the left panel contains the specification field name and value pair selected by the user 315. The user selects the specification name and value on the web page 314. Optionally the user can set the data field value to a constant for fields which do not change from page to page. The user can optionally edit the data field value prior to setting it to a constant and saving it. The data field values are embedded in the website 3rd party predefined set of data field names for this web page template. The data record, which includes the list of data field name/data field value pairs as well as the XPATH and semantic type of the data field value, is sent to the server. Then, popup appears 316 with data field names and extracted data field values, the images, features, specifications and select or create collection tab 318. The data cleaner runs in the background and cleaned data field values are presented to the user in the pop up 317. Turning now to FIG. 3*d*, the pop up 319 and the images tab 320 inside of the pop up 319 are shown. The select collection tab 321 and the list of collections that the user has already created are shown in the pop up 319. The specifications tab 323 in the pop up 322, create a new collection tab 324. The specifications tab 323 contains the list of the extracted specification name/value pairs. The user has an option to revert the changes made by the cleaner or to submit the cleaned data record. Optionally the user can add a comment about the extracted data prior to sending it to the server.

When a user presses the web browser device button in the widget the data field names and data field values in the section containing the data field values enclosed by the 3$^{rd}$ party predefined set of data field names (which may be synonyms of a common set of data field names), the page url, the user session data, a user selected collection on the social networking site to add the data record to, automatically assigned/user assisted category, tags, and other interesting information on the page such as the breadcrumb and title is sent via a form to the website. Transmission of data records extracted from web pages using newly or previously defined templates which are stored on a remote server and retrieved for the purpose of extracting the information from the HTML page markups by the widget or the button or browser extension is a benefit of the present invention.

Figure 4:
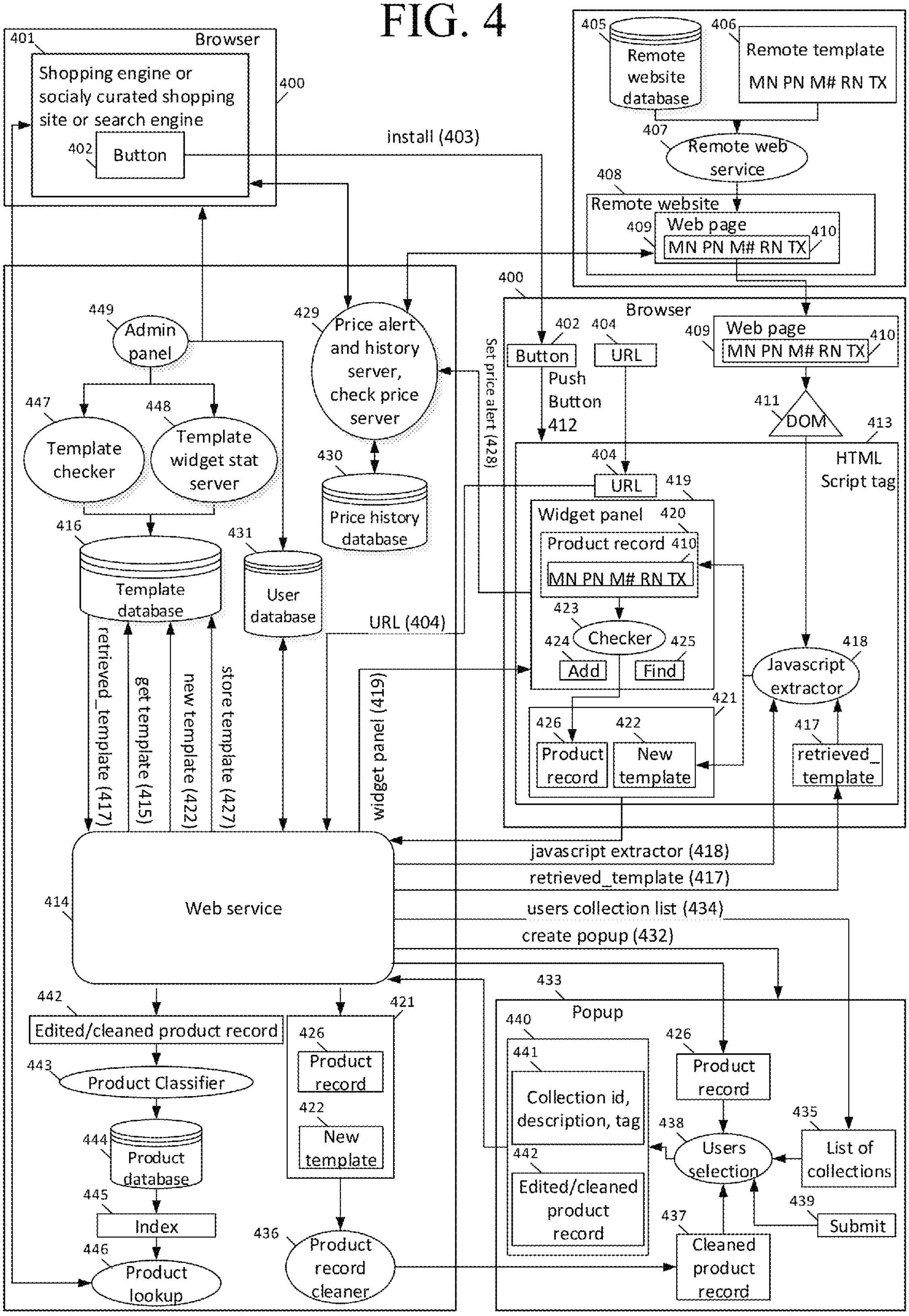
FIG. 4 is a block diagram of a data extraction system.

Turning now to FIG. 4, if the user selects in the widget panel to receive an alert when the product price changes that request will be sent to the price alert and history server 429. Price alert and history server is communicating with online stores, manufacturers and other product services through the price server. Price alerts can be set for a date range, a minimum or maximum price and other criteria which trigger a price alert which is sent to the user. The check price server will periodically download the remote web page, extract the price and check it against the price alert. If necessary an alert will be sent to the user and the price will be recorded in the price history database 430. The product templates are checked by the template checking system 447, which notifies operators and users as the page(s) change that the template(s) need to be updated, then the updated templates are sent to the widget template database 446, and the updated templates are then used to extract the data. Without a template checking and updating system a price alert system will fail if the structure of the product page changes.

The user can select one or more additional images on the page and submit them with the extracted product record. The additional images are shown on the extracted product page in the web site.

In all three cases, the tuple (data field name, data field value, XPATH, optional constant bit) extracted from the page is added to the list of tuples. Therefore the button will transmit a set of tuples containing data field names, XPATH's, and semantic types for the visible elements on the page to the server so that the server can extract the data. A Javascript extraction engine which is downloaded from the site uses the downloaded data record template to extract data from the current page in all of the described extraction methods above: visible and hidden data records with data field names and data records that the user identifies.

Figure 5:
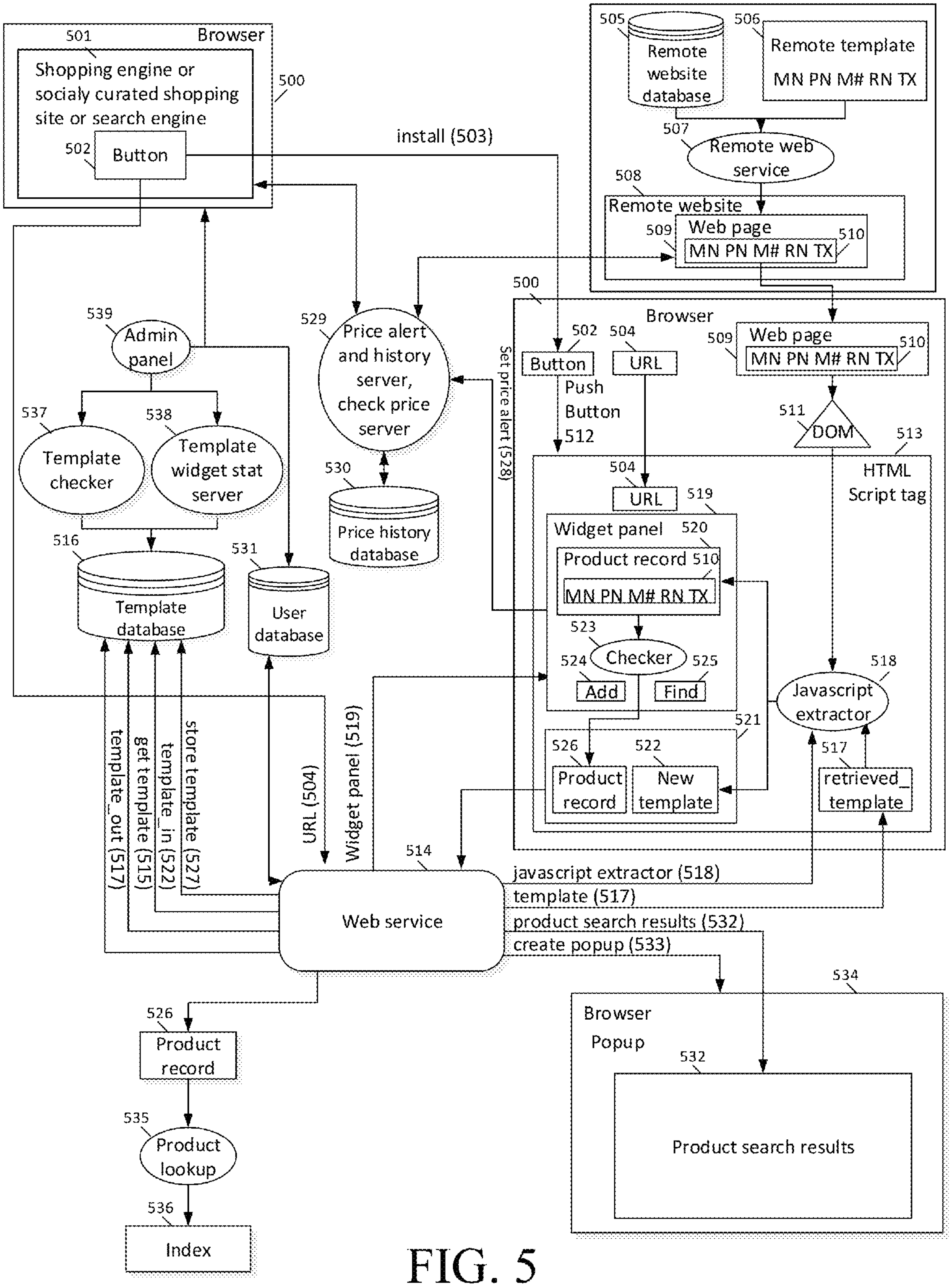
FIG. 5 is a block diagram of a data extraction system.
Figure 6A:
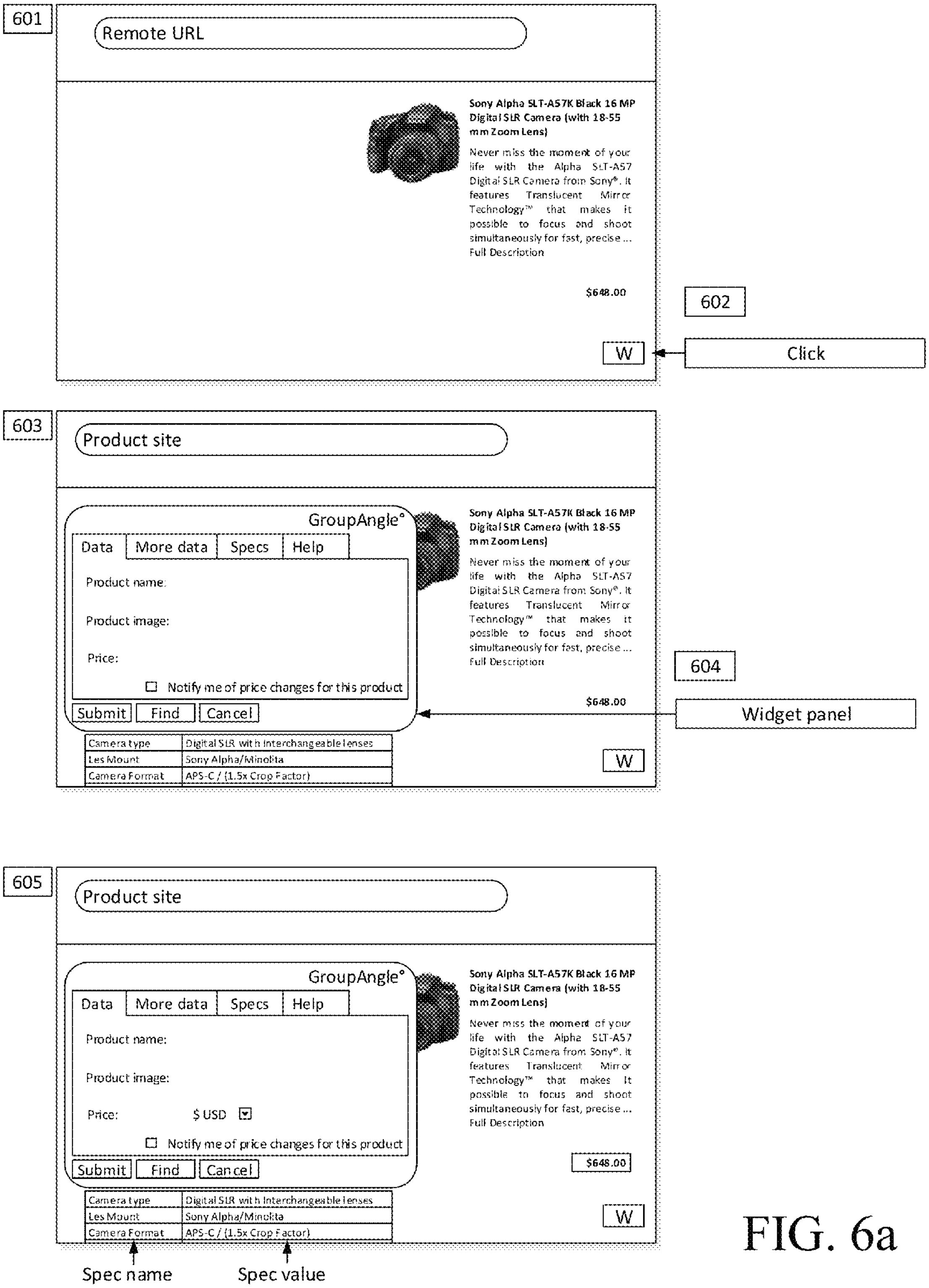
FIG. 6*a*-6*c* are wireframe diagrams showing details of a web browser device.
Figure 6B:
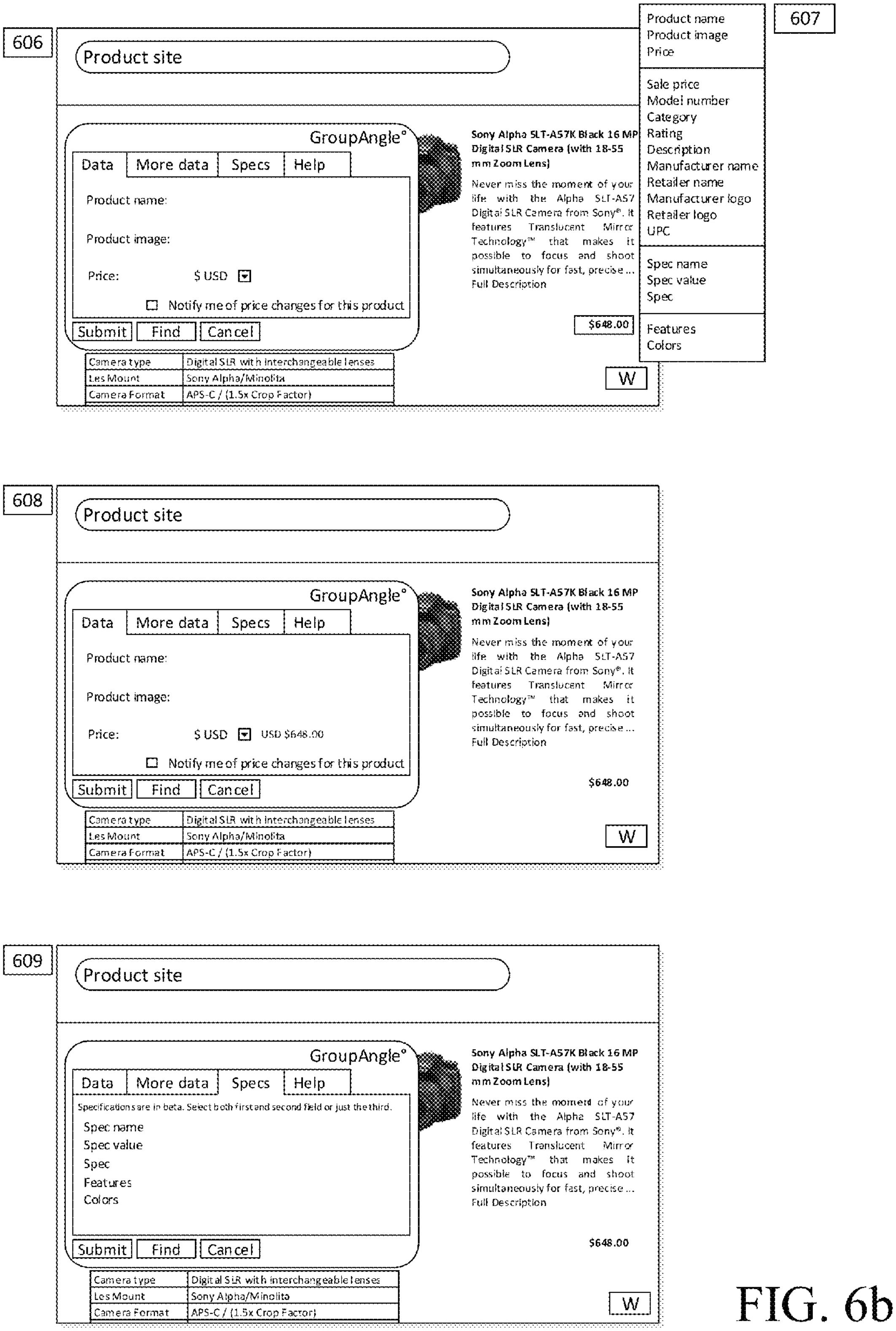
Figure 6C:
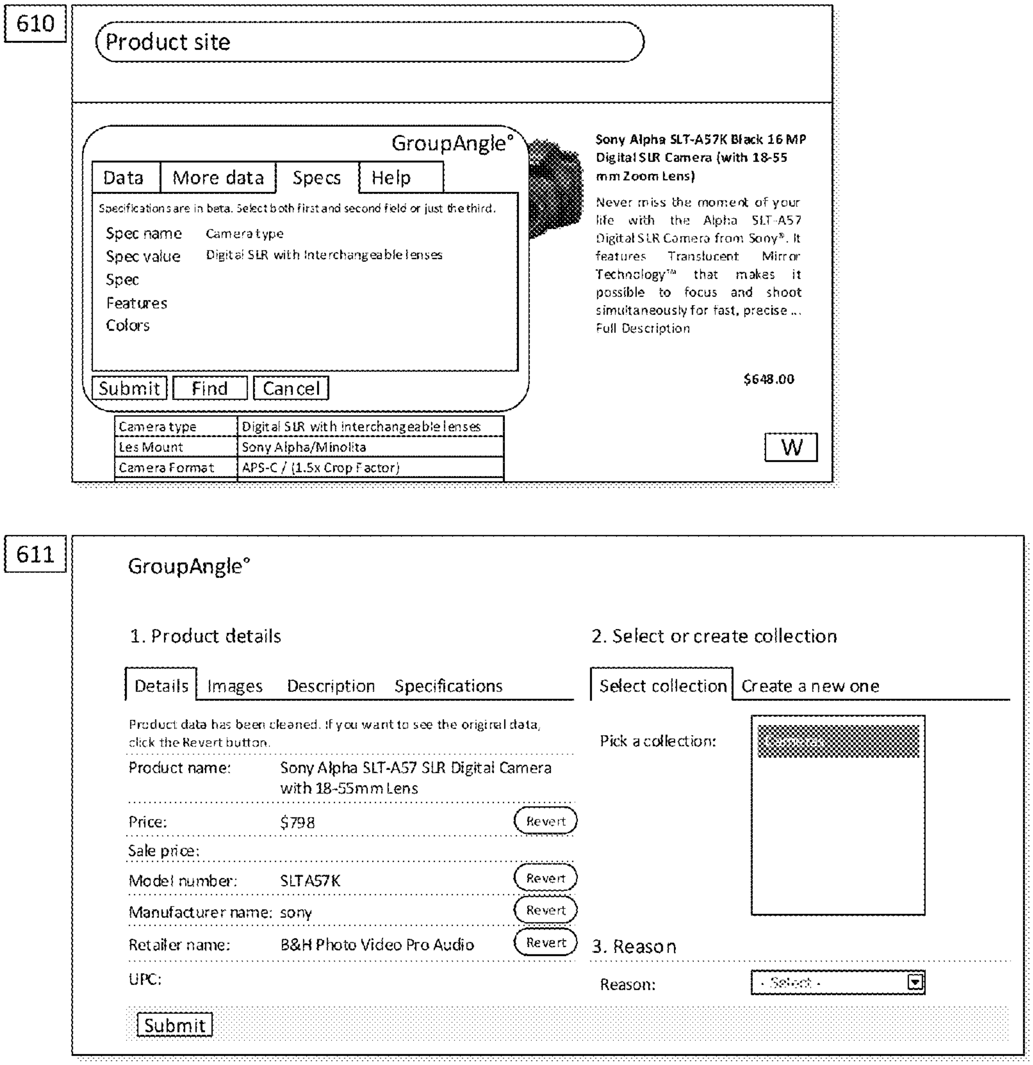

The data field values are available for editing by the user via a form on the widget panel. The data field value can be marked as a constant throughout the site. In one embodiment of the present invention, the user navigates to a remote page containing a product data record via the page URL. The user runs the web browser device widget on the page in the browser. The root URL is looked up in the template database, and if the template is found it is returned to the user. Otherwise the user selects the fields on the page that correspond to the data field value names in the right click menu of our widget. The widget panel data field value fields are populated with the values extracted from the page using the right click menu that correspond to the widget panel data field names. Turning now to FIG. 5, the user presses the FIND button 525 on the web browser device widget panel 519 to search for the product in the product index 536. If a new template was created by the widget then the new template is sent to the template database 516. The extracted product record 526 is sent to web services 514. The web service then sends the product record to the look up 535 which queries the index. If the query returns a search result then it is sent back to the web service and the web service creates a pop up 533 and sends the product search result 532 to the popup 534 or browser tab. The browser popup displays the product search results and the user than selects the URL and goes to a remote website where they view the product information. The rest of the operations in FIG. 5 are the same as in FIG. 4.

The XPATH's in the widget extraction template are traversed by the Javascript extraction engine to find the data field values. An example XPATH is shown in FIG. 1, elements 102, 103, 104 and 105. The Javascript extraction engine thus utilizes the browser's existing DOM to find the data record information using the XPATH's in the widget extraction template(s).

Selection of text in an HTML page by our widget. More than one data field value about a product web page or other type of data record web page may be contained in a single HTML markup tag pair. For example, <div> Sony S2134 UnderwaterCamcorder </div> contains the manufacturer name, the model number, and the product name. The user will right click on the information that appears in the page with in a rectangle, select the information, and associate it with a data field name. The problem is that three data field values appear in the same rectangle and multiple data field names need to be associated with the data field value. The solution is to allow the user to associate more than one data field name with the rectangle and to store the relative order of the data. This is a problematic approach without a semantic analysis engine that will separate the multiple data field values that are extracted from the single HTML tag pair. The data field values can be identified by semantic analysis in a process that runs on the server. The semantic analysis includes the identification of token that are manufacturer or retailer names, alphanumerics, prices, and which appear in other parts of the page.

One example of a page that contains information in multiple places that may be used to identify and segment the multiple data field values in the HTML tag pair is as follows:

```
<title> Sony - S2134 - UnderwaterCamcorder </title>
        <div> Sony S2134 UnderwaterCamcorder </div>
```

The title contains separators '-' which were inserted by the web master to assist search engines in parsing the title. The title information is automatically extracted from the web page and sent to the server along as part of the data record. The segmented title information is then matched against the strings in the other extracted data record fields. Longest substring matches in the example between the title and the string(s) in a particular field, along with semantic type information assists the server in identifying and segmenting the multiple data field values in the HTML tag pair. In the template created by the widget the HTML tag pair will contain 3 data field names. The server side cleaner will identify the multiple field values and extract them and associate them with their respective data field names. The cleaner can generate additional information about the HTML tag pair contents and add it to the data record template that the user created. The data record template is then passed to the automatic extraction process which will extract the data from all of the pages on the site. The automatic extraction process can use an unmodified extraction template to extract the multiple data values between the HTML tag pair, a modified data record template to attempt to identify and segment the multiple data values between the HTML tag pair, or can defer segmentation to the cleaner which can attempt to identify the multiple data values between the HTML tag pair using semantic analysis or attempt to use the template information about the multiple data values between the HTML tag pair. Additional symbols which appear in product records, such as trademark or registered symbols, currency symbols, separators, constants, and data field names are used during the segmentation process. Additional segmentation of the product name in particular can be done if there are specifications present in the page, the title, the breadcrumb, and the product name. The user selects each of these page elements and associates them with a data field name using the right click menu. The server side will use the single specification name and value pair or line to extract the repeating pattern from the page. The specification values are then matched using a longest substring match or other similar method against the product name, title, breadcrumb, and URL to find specifications that can be used to segment the strings and divide them into distinct data field values.

Rewriting the DOM. Another common problem in selecting data field values in web pages containing structured data records is when the multiple data field values occur within the same HTML tag pair but appear on different lines in the web page. When the user tries to select the individual data values, within the HTML tag pair, multiple lines with different data field values are selected. Every text node must be the only child of its parent in the DOM. If there is more than one text node under a parent then a span node is inserted above each text node. In the example below, the DOM is modified presence of single HTML <br> (newline) tags at the end of each data field value within the HTML tag pair, creates multiple text nodes under the same parent.

```
<div>
  Sony <br />
 S2134 <br />
 UnderwaterCamcorder <br />
</div>
```

The Dom can be rewritten as follows:

```
<div>
  <span> Sony </span><br />
  <span>S2134 </span><br />
  <span>UnderwaterCamcorder </span><br />
</div>
```

Rewriting the HTML tag pair puts each line in its own tag pair and the individual data fields can then be selected by the user.

Book Marklet. Turning now to FIG. 3, the web browser 301 contains the widget (a bookmark in the browser bar or the button in the page) or browser extension as shown in 306. We will describe the operation of the widget. The operation of the browser extension is equivalent. The widget contains Javascript code which communicates with the website server. The bookmark or button contains Javascript code which has an IP address or a URL to which a request is sent. The request contains the name of the root URL for the site that the current page belongs to. The root URL is a key for the widget template database. The database returns a list of templates for the root URL. The templates were created by users at the same site using the same or different pages containing data records. The templates can have differences in the XPATHs and the data field name/data field value tuples. The website server returns the list of templates and a Javascript extraction engine to the browser. The browser then executes the extraction code using the XPATHs and semantic information in the templates to find the data in the page. The best matching XPATH for each data field name/data field value is used to extract the data. Variations in XPATHs due to child number differences (e.g. the XPATH says that the data field value is on the third branch when in fact it is on the fourth branch on this page) are handled by traversing the different children below the point where the child numbers are indicated in the XPATH specification. Multiple templates can be stored for a single site and multiple templates can be returned to the widget and used to find data that may not be in the same location on all pages.

Alternatively, the remote site can put the widget button on the page and not put 3$^{rd}$ party data field names in the page source. Then is going to set up the templates for their pages on the website server using the widget, button or browser extension in the following way. In this case the site passes the data record values to the button widget that cause the widget extraction panel to popup for the user with the template values that are defined in a data record template for the site. Note that a site can have product records, music records, recipes, movie records, or any other kind of repetitive structured data. The user selects a preexisting template or creates a new template type to associate with the site. The user then uses the template to capture the template information on the page and transmit it to the server. When a user presses the button in the web browser the extraction engine requests the site template from the website server. Note that there can be more than one template for a site but in general there will only be one template type (e.g. templates for product records). The site template(s) is retrieved from a remote server. The site is thus giving website explicit permission to extract the data from the page using a template that is stored on a website server. If the website server does not yet contain a template for the current page at the site, then the user is prompted to create one. The extraction engine then extracts the data values at each XPATH to form a tuple with the corresponding data field name. The advantage to the site in this case is that they only need to add the widget button and make a template for the page's template using the website widget. A further advantage is that the site is giving the user explicit permission to extract the data and there is no ambiguity about fair use of the data with respect to copyright. The site then gives users permission to copy the data from the site to a remote web site, to add the data to a collection on a remote web site, to store the data in a database at the remote web site.

The website has a "add product" button which when pressed pops up a window with a dialog box for the user to enter a URL of a product page that they wish to add to one of their collections. The URL is looked up in the template database. If the template is present the page at the URL downloaded and the product record is extracted from the page and sent to the cleaner. The cleaner cleans the product record and send the cleaned data back to the popup. The user then selects the collection or makes a new collection to add it to, optionally writes a description, selects a category, a reason that they are adding the product to their collection (e.g. Going to buy it, they like it, . . . ), and then they press the submit button. The product record is sent to the server where it is then processed as the other records submitted above are processed.

Turning now to FIG. 6*a*-6*c*, 601 to 611 show the contents of the widget. The embedded widget button 602 is used to extract information that is hidden in the web page as shown in the panels in FIG. 4 or is used to lookup a template as previously described. If a template is not already created for the page type at the remote website then the user goes through the following steps to create the template. The widget panel 604 appears in the web browser page 603. The user selects values from the page in HTML tag pairs by hovering over the information. A rectangle is shown to the user 605 around information contained in an HTML tag pair. The empty specification tab is shown in 609 prior to the user selecting the specification attribute name and value. The user can select the specification attribute name and value in 605 and the selected name and value are shown in the widget panel 610 after the user selects the specification attribute name and value using the right click menu 607. The price value is extracted from the page 606 and inserted into the widget panel 608. The pop up is shown in 611 with the extracted product data.

We will describe a method for extraction of structured data from a page containing a data record at a site using a $3^{rd}$ party predefined set of data field names when an embedded button 602 is pressed on the web page 601. The data record is located in a set of HTML tag(s) with corresponding data field names. An aspect of the present invention provides that a $3^{rd}$ party predefined set of data field names are used to enclose the data field values on the page. $3^{rd}$ party data field names are placed in attributes next to the data field values in the HTML tags. Examples of hidden data records in web pages include micro formats and rich snippets. The extraction engine searches for the hidden data field names and extracts the XPATHs, data field name/data field value pairs. The visible text on the web page contains the data record, typically only the data field values without the corresponding data field names. The $3^{rd}$ party predefined set of data field names are inserted into the HTML page as invisible text (not visible to the viewer but in the page) next to the corresponding data field values using a web site template, just as the visible text containing the data record data field values and optional data field names is inserted into the HTML page using the website template. The $3^{rd}$ party predefined set of data field names and the corresponding data field names, may also contain a set of XPATH's to the marked up data record fields so that extraction templates can be created to extract data using the same markup template automatically from other pages using the same web site template from the same site. Extraction of visible data records in markups using the hidden data field names by our widget or the button or browser extension is a benefit of the present invention.

If the site owner agrees, the website button can in effect call the same Javascript from the widget on the data field name/data field value pairs and capture the XPATH information to each data field name/data field value pair and transmit this structural information to the website server. The site owner embeds special attributes in the HTML at the HTML tag location enclosing the data field value and optional data field name. The website sends the website Javascript extraction engine to the browser. The Javascript extraction engine determines whether it has previously stored a widget template on the website template server or whether the page has a hidden data record based on the type of call to the website server from the remote web page (e.g. button extraction of hidden data or template widget extraction). In the case of a call by the button for a hidden data record extraction the Javascript extraction engine searches for the special attributes in the HTML at the HTML tag location enclosing the data field value and optional data field name, creates the XPATH, extracts the data field value and optional data field name and puts the information in the widget panel. In the case of a template extraction call the Javascript extraction engine extracts the information from the page using the template widget. If the template widget does not exist then the user is prompted to make it.

Alternatively, the widget extraction engine can calculate the XPATH's from the root of the markup page to the hidden data values fields so that extraction templates can be created to extract data using the same markup template automatically from other pages using the same web site template from the same site. Extraction of individual fields in hidden data records in markups using the XPATH to the hidden data field values by the widget or the button or browser extension is a benefit of the present invention.

We will describe a method for extraction of structured data from a page containing a data record at a site using a hidden duplicate data record, with the hidden data field names and value pair list in the HTML but not visible on the browser, when a button is pressed on the web page. An aspect of the present invention provides that a $3^{rd}$ party data record marker is used to enclose the data field names and value pair list on the page. The invisible data record is extracted from the web page as a block. The hidden HTML markup contains the $3^{rd}$ party predefined set of data field names and the corresponding data field values which are sent to the website server when the button is pressed, resulting in the extraction of a single hidden data record using an XPATH to the hidden data record HTML tag pair that contains the hidden data record by the widget or the button or browser extension.

Templates are created by the user by pressing the widget bookmarklet, extension, or button which causes the widget panel to appear. The user then hovers the mouse over the elements in the page and a rectangle appears around the text that is in a single HTML tag pair. The user then right clicks on the rectangle and a menu appears. The user then selects a menu item.

Selection of color name, values, and image identification and extraction data fields using the widget menu is done by selecting the items that are related to colors with the widget right click menu. Color items can either be one per page or repeating patterns. The server side extraction will determine the color organization case for each page. The colors are then extracted from the page by the server side cleaner.

Multi image extraction can be accomplished by the automatic identification of all images in a web page. The user is presented with a popup showing all of the images on the web page. The user then selects the images that they want to capture and display in their collection.

Ratings extraction (technicalities such as the use of CSS to render the rating stars do not prevent the extraction and correct identification of the rating associated with the product on the page. Ratings appear in an HTML tag pair and the user selects the rating using the right click menu as described above. The rating is then added to the data record template and data record which is sent to the server.

Furthermore, a user can use our widget to identify and associate data field value and name pairs on an HTML web page in order to send a search message back to the database server. This in effect is an advanced search because the search string is separated in phrases and the semantic type of each phrase in the search string is identified. The remote advanced search feature from a remote web site has the advantage of bringing the search facility and search results to the remote web page location the user is currently browsing. The remote advanced search feature saves the user from having to copy strings from different locations in the web page to a search box in another browser window or tab or to an excel spreadsheet or word processing document. The data record information in the web page is extracted by one of the methods described above, the data record is transmitted to the search engine, the data record is looked up in the index and the search results are returned to the browser, and appear in a browser popup. Advanced search by the widget or the button or browser extension is another benefit of the present invention.

The structured information which will be sent to the server is enclosed in the HTML markup containing the $3^{rd}$ party predefined set of data field names and the corresponding data field values includes the retailer and/or manufacturer logos, the retailer and/or manufacturer names, the product name, the model number, the product picture, the sale price, the description, and any other interesting data field values on the page. Note that the HTML markup containing the $3^{rd}$ party predefined set of data field names and the corresponding data field values is not visible in the browser window and that a second set of identical data field values are in a separate HTML markup section are visible in the browser window.

The user can use the advanced search process to also identify the rich attributes on a page and return the rich attributes with the search to enhance the search from the remote site, leading to a more specific search result. Advanced search provides better search results by extracting rich attributes which are used to narrow down and create a more relevant set of search results is another benefit of the present invention.

The website stores the extraction templates for each template type in a data store. The key for retrieving the widget extraction templates is the root url for the site the template belongs to. The templates include the XPATH to the data element, the data element type, the data element data field name, a boolean if the data is a constant and should not be extracted, and if constant the data value to substitute for the page value in future extractions on this page layout type on this site. When a user presses the widget button at a site where the data field names are not stored in the page, the client sends the server a request for the extraction template(s), which are then used to find the structured data on the page.

Turning now to FIG. 4, the system operation when the user uses the widget button or extension to extract visible or hidden data is shown. The user will register at the shopping engine or socially curated shopping site or search engine 401 and install 403 the button 402 which will be visible in the browser 400 as an extension or a button on the browser's toolbar. User can then go to a remote party site 408 generated by a remote web 407 service which contains products which are stored in a structured data format generated from a remote product or other structured data website database 405 and a remote web site template 406 which produce a remote web page 409.

Then the user clicks on the embedded website button 402, on the extension or toolbar button in the browser while in the product page browser 400. When the widget extension or button is pressed 412 the HTML script tag 413 is created on the page and the javascript returned from the server is set as the contents of the tag. The browser than executes the loaded script which creates the widget panel 419 which appears in the product page tab.

Text in an HTML page is either visible to the user or hidden or invisible to the user. Product data records can be embedded in the product information web site page in the following ways; invisible data field name and visible data field value; visible data field name and visible data field value; no data field name and visible data field value; invisible data field name, invisible data field value, visible data field value; invisible data field name, invisible data field value, visible data field name and visible data field value.

Continuing with FIG. 4, shown are some of the methods for extracting invisible data records, visible data records and partial data records. If the invisible data record is embedded in the page then the Javascript extraction engine 418 will traverse the DOM 411, extract the invisible data record, and present the data record on the widget side panel. The widget panel 419 will contain a predefined information list 420 from that product page such as manufacturer name, manufacturer logo, model number, price, etc.

An example of an embedded record is below:

```
<a class="groupangle-embedded-record"
  href="//groupangle.com/"
  gapr_retailer_name="<name>"
  gapr_brand_name="<name>"
  gapr_product_name="<name>"
  gapr_product_image_url="<url>"
  gapr_model_number="<model_number>"
  gapr_description="<description>"
  gapr_retailer_logo_image="<URL>"
  gapr_brand_logo_image="<URL>"
  gapr_rating="number of stars/scale"
  gapr_color_names="<list of color names>"
```

-continued

```
gapr_product_page_url="<url>"
gapr_feature_list="<list of features>"
gapr_specification_list="<list of specifications>"
>
</a>
<script async="true" type="text/javascript"
src="//groupangle.com/resources/gatit_button.js">
</script>
```

Else if the visible data field values in the visible data record have invisible website data field names next to them then the java script extraction engine 418 will traverse the DOM 4, 411, extract the hidden website data field names and visible data field values in the visible data record, and present the data record on the widget panel 419. The invisible website data field values are associated with the data field names in the side panel. The side panel will contain the visible data field values in the visible data record from that product page associated with the visible data field names in the panel such as manufacturer name, manufacturer logo, model number, price, etc 410.

Alternatively the browser java script extractor 418 will send the url of the page to the web service 414 which then attempts to retrieve the template 415 from the template database 416. If the template database contains the template, the retrieved template 417 is returned to the web service with the java script extractor 418. If no template was found in the template database the panel will display "No template was found" message. The web service 414 sends the Java script extractor 418 to the browser Java script extractor. The browser Java script extractor will then check if the widget extraction template XPATHs and semantic types in the template tuples match the XPATHs in the browser DOM and extract the data field values from the DOM to form tuples. The widget panel 419 will contain a set of user selected data values from that product page such as manufacturer name, manufacturer logo, model number, price, etc 410.

Continuing with FIG. 4, if no template(s) are returned by the web service 414 then the panel will be empty (contain no extracted data from the page). The user will populate the widget panel by right clicking on data elements in the page and select an associated data field name from the menu. The Javascript extractor will compute the path from the root of the HTML markup to the data item and record it, along with the data field value and data field name. The data is presented to the user in the panel and data extraction template is created for the current site.

The data field values in the widget panel are checked 423 for problems such as a only one of the specification attribute name or value fields being present or not enough selected data field values. The user then presses the add button 424 in the widget panel 419.

The widget sends the product record in a post key/value form 421 containing the template 422, the list of tuples (data field name, data field value, XPATH, semantic type) to the web service 414. If the user selected a price alert option for the product in the widget panel, then the set price alert message 428 is sent to the price alert and history server 429 which then stores the price alert in the price history database 430. The web service creates a pop up 432 and sends the user's list of collections 434. User's list of collection 435 and the product record 426 are sent to the pop up.

The web service will send the URL of the page 404, the template 422 from the widget and product record 426 from the web page 409 to the data cleaner 436.

The cleaner 436 will clean the product record and send a cleaned product record 437 to the pop up 433.

The user then can select the cleaned data record 437 or the original product record 426 data field value(s).

The popup contains a list of the user's collections 435 that have been created previously and the option to create a new collection. The user then selects the collection to add the item to or creates a new collection that the item is added to. The user can then classify the item by assigning a product category from the dictionary taxonomy tree using the product classifier that generates a list of potential categories for the user to select from to associate with the extracted database record. The user can associate tags with the data record. The user can also select a normalized record from the normalized product database to associate the record with. The user then selects 438 either the individual widget product record data field values or the cleaned data field values. The resulting set of selected information from the popup 440 including the edited/cleaned product record 442, selected user collection id 441, is sent to the web service 414 after pressing Submit button 439.

Edited/cleaned product record 442 is created in the popup and sent to the web service. The web service sends the edited/cleaned product record 442 to the product classifier 443. The product classifier uses a dictionary which contains a taxonomy tree to classify the product record. The product classifier/db inserter sends a classified product record to the product database 444. The index creator then inserts the product records from the product record database into the index 445. The index is queried by the lookup 446 which returns search results to shopping engine or socially curated shopping site or search engine 401.

The page with the given URL 404 is downloaded by the cleaner 436 and the HTML parser creates the DOM 411 using the page. The DOM along with the template and extracted values are then passed to a series of modules. Each of the modules is responsible for cleaning one of the data field value types. There are modules for prices, features, specifications, colors, ratings, manufacturer and retailer names. Each of these modules uses template paths and extracted values to identify the exact DOM element which was selected by the widget as the container the information. The purpose of the price module is to extract currency and value of the price. In this process, a currency dictionary is used to identify the currency, and price is tokenized to identify the numeric value of the price. The manufacturer module is used to extract manufacturer name. The manufacturer name may be missing from the original record or may contain additional information, or may be in a different data field value such as product name. In the process of identifying the manufacturer name, the listing of existing manufacturer names is used in a form of a dictionary. Other information from the page, such as the title of the page may be used in this process. Additional data field name dictionary may be used. This dictionary contains data field names which often go next to the manufacturer name on pages. The features module completes the extraction of features. The original path and value are used to identify selected DOM element. Then a set of similar paths is found on the page (so called repeating paths). These paths are further grouped and the values from these paths are extracted as features. The specification module extracts specifications. It is similar to the extraction of the features. The same repeating path logic is used but this time specification name and value pairs are extracted. The retailer name module is used if retailer name is missing in the original record. The retailer name may be extracted from the url or title of the page. The color module extracts color names or color/pattern swatches (small images describing the color). The color name dictionary is used to identify the color elements on the page. Then the repeating paths are found and grouped in order to extract all colors from the page. The data cleaner can perform the following operations: (1) Remove extra text from the extracted data field values. Example, if the manufacturer name is extracted from the copyright field then the string can be analyzed and words can be looked up in a manufacturer name dictionary located in the server. (2) Normalize the extracted values such as retailer and manufacturer names using a predefined lookup table containing the synonym and base names. (3) Repeating lists of information such as features or specifications composed of a specification attribute name, value, and optional metric (a specification tuple) can be extracted from the original page using an XPATH specified by the user to the block containing the repeating pattern, a row containing a feature or complete specification tuple or a specification value or name. (4) Normalize the specification attribute names using a predefined lookup table containing the synonym and base specification attribute names.

The web service then performs the following operations: (1) the server generates a unique identifier. The product page URL 404 is hashed to a 256-bit UUID 12 by the web service 414; (2) the web service 414 sends the unique identifier and the user collection identifier to the user database 431 (where the unique identifier is added to the user collection); and (3) the server sends the unique identifier for the template in JSON form 422 to the template database 416. The template contains the list of tuples (a tuple consists of the following: data field name, data field value, XPATH, semantic type). The XPATH and the semantic type are to extract data field values from pages on the site, constructed from the same remote template 406, which are then associated with data field names.

The user and others can then see the data record 442 that was inserted into the collection specified by a collection id 441 on their profile page on the socially curated website 401. If the user has associated that product in with a normalized record, that normalized record would be selected and added to the extracted product data record in the collection specified by the collection id 441 and the normalized product database 719. Periodically a job is run to generate a new index 445 from the widget extracted product database 444 to make it easier to search for the products in user collections.

Creating a template for a repeating pattern in an HTML web page presents problems because there is a variable number of lines on each page that contains the repeating pattern on the web site. A repeating pattern in an HTML markup web page uses the same structure to hold information with multiple values, multiple name/value pairs, or a hierarchy of values. Examples of repeating patterns which contain product record information include specifications, colors, or features. The user selects only one row, name value pair, or sub tree in the repeating pattern using the right click menu that is enabled by the widget. The selection of one element in a repeating pattern is sufficient because the path from the root of the HTML tree to the root of the repeating pattern sub tree is identical for each repeating pattern element by definition. The repeating patterns below the root of the repeating pattern sub tree root also contain identical paths and may contain additional identical sub trees, extract paths, and optional sub sub trees. One method for the extraction of the name value pairs from the repeating pattern is a process of finding the parents of each of the root of each sub tree in the repeating pattern and extracting the specification attribute name and value pairs from the sub tree. Repeating patterns with tree like structures as shown in an example below are recursive in nature and have repeating patterns within repeating patterns. The same extraction method is applicable.

In order to render the information in a readable format tables or lists are created on web sites using HTML td/tr/ . . . , divs, and lists are used to hold the information. The tables may be row or column oriented. The repeating pattern may be hierarchical in nature. For example a table entry for an electrical specification may be as follows:

Electrical
  Amps: 1
  Watts: 100
  Volts: 100

In order to store the electrical specification in a data structure which can later be compared against similar products and normalized, the specification tree is then flattened to the following form.

Electrical:Amps: 1
Electrical:Watts: 100
Electrical:Volts: 100

Where the root of the DOM sub tree, Electrical, is added as a prefix to each row in the block below. This is necessary in some tables because there may be the same sub specification attribute name which appears in different sections. The server side extraction and cleaning of the data record relies on the quality of the template.

The data records representing the same product records from different retailers and possibly the manufacturer of the product are presented as different records in the search results. As a consequence the user must manually compare the prices for the same product from different sources. In order to provide an efficient mechanism for the user to find the best price it is desirable to normalize the product records.

Duplicate records are identified for the same product at the same site and a single record is selected as a canonical product record for the particular product that is located at different web sites. The canonical product record has references to the each of the product records located at different web sites.

The same product may be found at different sites. The product records from the different sites which contain the same product record are identified and a single record that points to all instances of the product at different sites is produced.

The data field names and values, as well as the specification attribute names and values, are normalized. The names are normalized using a synonym dictionary. The numerical specification values are normalized using the metrics. A voting system is used to select the product classification category(s) for the product based on the product classification category(s) which are found in each of the product records for the same product from the different web sites.

The normalization process involves creating a canonical record for the product attributes in the product record and a list of the seller specific attributes such as price, taxes, shipping, social opinions about the seller reputation with respect to the product category associated with the product, seller policies such as return periods and warranties, seller product knowledge, and the social reputation of the seller with respect to the product, product category, and social interaction with customers. All of the above types of information are available in various combinations in retailer product records and reviews.

Product records from the widget extraction process, automatic extraction process and which are downloaded using a data feed or other method are converted, normalized, cleaned, classified, and indexed.

Figure 7:
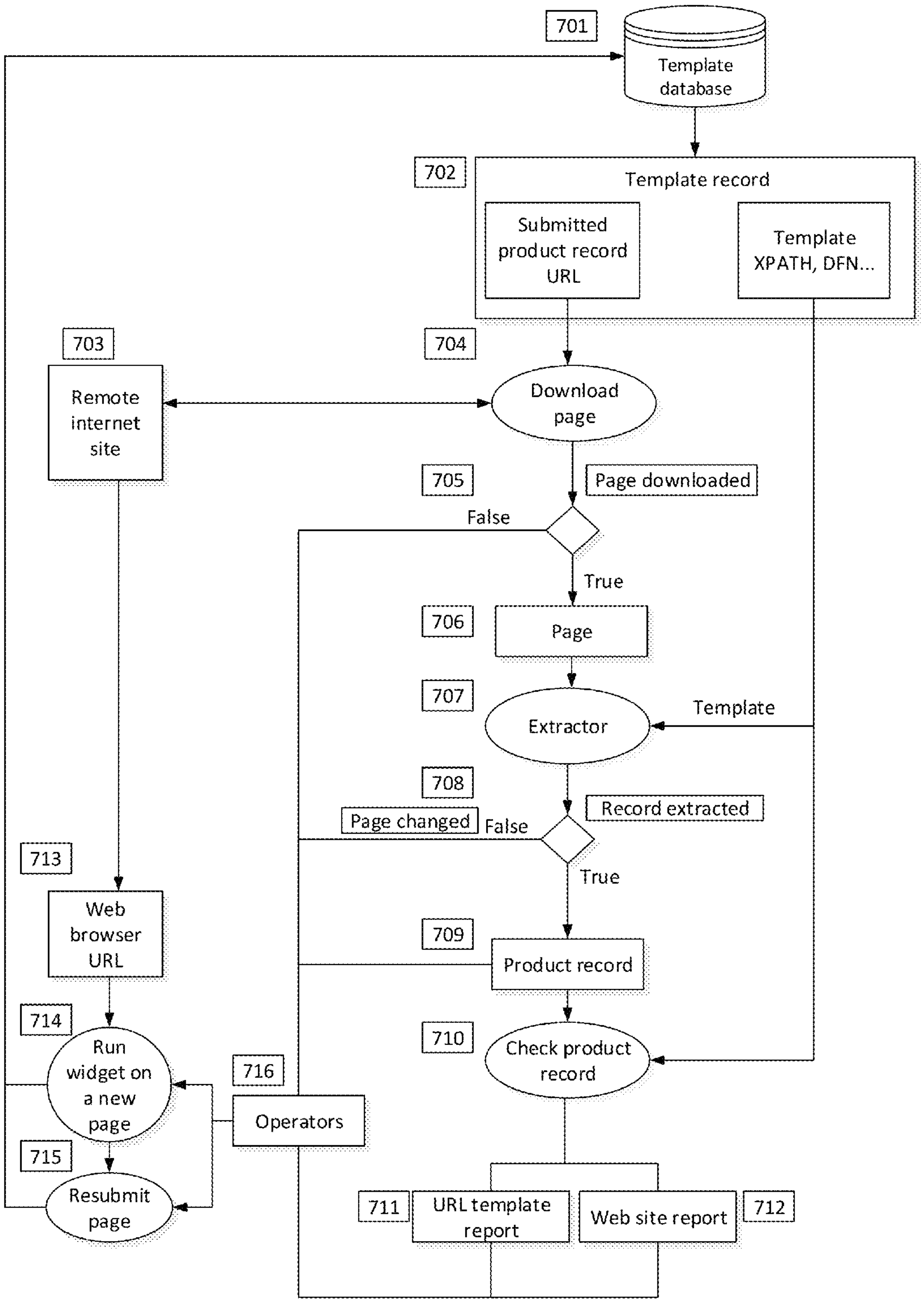
FIG. 7 is a flowchart diagram of a data extraction system.

FIG. 7 represents the data processing system. The following flows are shown in the diagram: affiliate marketing flow, automatic extraction flow, widget flow, database merge flow, price history server flow and template checker flow.

The affiliate flow does the following: the product record information in the online store database at the affiliate marketing website is accessed by the ftp down loader which fetches the product record data feed.

The automatic extraction flow does the following. A product information web site is connected to the remote web service that reads remote template(s) containing the data field name variables, and remote online store database to generate the site. The page downloader or crawler reads a list of sites or pages from the online store list and downloads the product pages.

The downloader and crawler download pages from sites which contain data records. The downloader and crawler use the online store URLs to download the product pages.

The downloaded pages are then used in conjunction with the selected corresponding site template from template database by the automatic extractor which extracts the product records from all pages matching the site template. A site may have more than one site template. The product pages are processed by the automatic extractor which sends the root URL of each page that it is processing to the template database and retrieves the widget extraction template. The widget extraction template is converted to an automatic extraction template. The automatic extractor extracts the structured data record from each product information page using the automatic extraction template and creates a product record.

The affiliate and automatic extraction flows each are read by the cleaner. The cleaner analyses each downloaded product record and produces a cleaned product record. The cleaner moves data field values and partial data field values from one data field to another, removes extraneous text, verifies the correctness of the data field values, and calculates statistics on the number of good/bad data field values using semantic checking. Cleaned product records are then classified by the product classifier. The product classifier matches data records to one or more product classification tuples from the product classification tuple list using words from the data record which are product classification base or synonym words. The classified data records are normalized by the normalizer. The normalizer will de-duplicate the product record stream, group records together which are the same record found at different sources (e.g. stores, shopping engines, socially curated sites, blogs, and manufacturer sites), refine the classification of a group of the same product records from different sources using methods such as voting. Further normalization steps can also be performed. Automatic extraction, cleaner, product classifier and normalizer and grouper are communicating with the Dictionary database 704 receiving from and sending the information to it. The resulting cleaned, classified and normalized product records are saved in the affiliate product database.

A separate mechanism for facilitating extraction at a web site would involve a file that is listed in the robots.txt that contains a template for pages identified by a url template. This would involve an extension to the current robots.txt file format. The extraction engine can retrieve the template and the url pattern from the remote site using the path supplied in the robots.txt file. Then extraction engine can apply an extractor generated by the template to the pages on the site matching the url pattern and extract the data records from the site and store them at a server. In addition a list of pages matching the template could be supplied via a mechanism similar to the sitemap.xml files, that are currently used by sites to increase their page rank at search engines.

Automatic extraction can use the URL of the submitted page to identify other pages on which the data record extraction template will probably match the template of the submitted page.

Once a template 427 has been put into the template database 416 it can be converted into a structured data extraction process template which is created in automatic extraction. An automatic structured data extraction process template is created by converting the widget template to a structured data extraction template which is used to do the structured data extraction of all pages matching the template. All pages are downloaded from the site. Each page is tested to see if it matches the structured data extraction template. If there is a match the data record is extracted from the matching pages. The extracted record is cleaned, classified, normalized, and stored in a database or index. The extraction process can then generate a merged/normalized database.

The widget extracted product records database, extracted product database and affiliate product database are merged by the database merger and a merged product database created. The merged product database is then indexed by the indexer and an index is created.

The template checker 447 can either check the template in real time and return feedback to the user about the quality of the template or the template checker will run a periodic batch job to check all of the templates in template database. The template checker report and the template widget stat server 448 template checker report are available on the admin panel 449 on our site.

Verification of data transmitted via the website button and form with name value pairs can be done via several mechanisms: comparison to previously extracted data, automatic and manual voting, user reputations, and operator verification. One possible problem with the button is if the page has missing data due to data being deleted from the back site database.

Turning now to FIG. 7, the template server has a data record template checking system. The template database 701 contains template records 702 which contain submitted product record URL, template XPATH, and data field name. Users may not always create correct or complete data record templates. Pages submitted with templates may change. The template used to create the template may change. The data record template checking system detects these changes, errors, errors of omission, and other template related issues. The data record template checking system down loader periodically downloads the page 704 that the template was created from. If the page is not available 705 then the report for the template says “page not available” then an operator 716 receives a report that they need to run the widget 714 on a new page 713 to extract a new data record from a different page at the remote site 703. The next time that the download process extracts data from the page using the template the resulting product record will be checked using the new page that was submitted by the operator. If a new page is downloaded successfully the template is then used by the extractor 707 to re-extract the data record from the downloaded page 706. The newly extracted data record 709 is compared 710 against the previously extracted data record. A report 712 is generated with the match/mismatch information and a URL template report 711. Next the list of template data field name/data field value/XPATH tuples are checked against the page information. The data record for the site contains a set of data field name/data field value pairs. For each data record data field name/data field value pair that is missing in the data record template the template checker will search the page data field name keyword synonyms and the base word that match the missing data record data field name/data field value/XPATH tuple. A report of the data field name keywords that do not have matching template elements is also generated for the template. An operator then can fix the template by revisiting the page used for submission. The operator then updates the data record web page template by selecting new or different information on the web page. The template is then resubmitted it to the server 715. The next time that the template checker runs the newly submitted template will be checked and a new report will be generated. The data record template checking system improves the quality of the data extracted from pages using the stored templates. A data record template checking system periodically runs to check the state of each template and generates a report which notifies operators or users that the template(s) need to be updated or remade or a new page needs to be submitted.

Data records which are extracted and stored in a database can be indexed by an inverted index generator such as Lucene. Additional faceted search indexes can be generated using the detailed rich attributes such as colors, features, and specifications. Indexing data records found on web pages, facilitates efficient search for end users of the socially curated web site, shopping engine or general purpose search engine.

Extracted product records from different retailer and manufacturer sites which are classified and normalized/deduplicated and are then grouped together by manufacturer name/model name/number/UPC and other methods facilitate efficient end user search. The advantages of indexing and search for the end user of a normalized set of data records is well understood by those versed in the state of the art.

Product lookups using the index can then be performed on the website shopping engine. The search query is sent to the product search index which then returns search results to the web page.

Creating a single product record with a master set of product attributes and a list of retailer attributes that can be displayed as a single record in a search result that links to a detailed list of the retailer attributes facilitates a more efficient decision making process for the consumer. For example, the consumer can then compare the prices offered from different retailers.

The extraction process is transformative in nature, thereby complying with the copyright fair use doctrine. The data extracted from the page is presented to the user in the panel. If the user chooses to do so, some data in the panel may be edited. For example, the company name that owns the site may be extracted from the copyright notice or some other field on the page which is in a fixed position on each page constructed from the same template. In addition edited and unedited data in the widget panel can be marked as constant throughout the site. Examples of constant data on a product page, include the name of the site and the site logo. The extraction process on flash pages may require that the user take a snapshot of a flash image that cannot be extracted. The snapshot is then uploaded to the popup and is added to the data record. The transformation process includes resizing the images, determining the maximum dimension for the images in the x and y dimensions. Additional transformations include automatically classifying and cleaning the data using a data cleaner, normalizing the data field name(s), specification attribute names, and specification attribute values. Further normalization includes inter record normalization using all of the information in the data records. Normalization of data records is done by comparing the fields in different records and sorting the records by those fields.

Currently, users want to create collections of items, at socially curated networks, that they find through web searching or browsing. An item is something extracted from another web site or from the same website from the site's database or index and is stored in a collection. These collections can be used by users to create kits, items they like, items they want to share, items they want to choose between, items they want to buy, items they want their friends opinion about, items that they have purchased, items they want to share with a specific group, items they want to ask a question about. The items in these collections that point to a page at a remote site refer back to the original source of the item and hence can be like bookmarks. Users want to be able to choose among items based on their relationships to other items, product categories, stores, brands, what they own, what they use and how they use products, where they use products, what they think of stores that sell products, what they think of particular brands, what is trendy, and what other people like.

Other items that they can add to collections include event information such as dates, locations, name of the event. Events include but are not limited to concerts, league schedules, game, and conventions. Photos are often stored in the same format on the same web site. A reference to the image storage location is stored in a photo data record in a data record storage system such as a relational database or a NOSQL data store. The photo data records often contain the image or link to the image, the date that the photo was taken, the name of the people, place, or things in the photo, and technical image information. The photo records can also be stored in the collections. Music on the web is often presented as part of an album which contains the name of the album, the song list, the publisher, and the artist's name. The album records can also be stored in a collection. Topical information which is stored as data records at different sites such as the data records for professional sports players, teams, and stocks can be extracted from different sites and stored in the same collection.

Users want to get feedback based on their collections; either by written messages or voting. The users who view the collection can add comments to the individual records and notifications can be sent to the followers or owner of the individual record or the collection. The notifications are stored in message queues. The recipients access the message queues.

Users also want to share their collections with specific groups to which they give permission or with the whole world. Users want to see the collections of other users; similar to user viewing other users bookmarks on services such as Delicio.us. Users want to view collections by classification, keyword, social connections, social ratings, user opinions, expert opinions, brand, product, category, or recommendation.

If the page at the site does not yet contain a template and the widget panel contains no data and the user does not want to create the template then the user may request that the system ask someone else to create the template for them. The request will be sent from the widget to the server where the request to create the template is sent to the website administrators and to users who have indicated that they will create templates to all users. The list of template creation requests can appear on the user's wall. Users can click on the template creation request and can then go to the site where they will create the template and upload it to the server. The server can optionally prompt the user to add the extracted product record to their collection. The server will then send a notice to the user that requested the template be created. The user which sent the request will see a notification in their inbox that the template has been created. They can click on the notice, see the link to original page that they sent the template creation request from, go to the original page, and extract and save the data to one of their collections. The request system offers an advantage over systems that are non-cooperative in nature. One user may request help from another user to create a template. The two users do not need to know each other. The helping user may gain points in a game mechanics system or points which may be redeemed for other benefits such as discounts or credits on purchases. If no user responds to the template creation request then a website operator can make the template for the user. The notification system works the same way in this case. There may be a time limit placed on responding to template creation requests. A system, optionally utilizing game mechanics, can notify other users or an operator that a first user would like a template created for a remote site.

Users view many websites for items of interest, but they want a tracking or bookmarking system to capture the items of interest at different sites for future retrieval and viewing. Once users have related items, they want to decide who to share them with by selecting permission level, request recommendations from friends, the world, experts, or social connections in their social graph. That recommendation can be a vote, written opinion, or request for alternatives. Users also want to copy items from other user's collections. Users may also want to suggest to shopping engines what products or brands should be in the shopping engine database and index, by selecting the information on a product web page and sending the products and/or brands to the search engine.

The user can view a list of products and add extracted structured product information from a store or manufacturer or other product information source to a collection of items in a user profile on a social network.

First, the user logs into the website using their user name and password. After logging in, the user profile page appears. The user profile page contains the information that the user added by the user, such as photos (biography, and other user information), lists (your collections, groups, questions/answers, followers, and following) and the latest activity related to each of the user's collections of information. Other users can add comments about the user or to any object stored on the user page such as a product record, a question, or a group. The latest user additions to each collection (internal or external product page database records—from web pages) also appear on the user page. The user can click on a collection name and go to the page containing the set of database records belonging to that collection. The word internal and external can appear in the hover bubble to identify internal and external data records (e.g. products). Data records contain data field name(s) and data field value(s) that are shown on the collection page. A product data record has many fields such as, a category, a manufacturer name, a product name, an image, a description, specifications, etc.

A user utilizes the widget to extract data record and add it to a collection on a site. In addition, the information sent to the server by the user can be used as part of the information to identify websites of interest to extract data from, and form extraction templates from the user generated templates. User identified web sites have a higher interest level than non-user identified web sites. This is analogous to a page rank for pages. Users indicate that they are interested in the site and submit pages of interest. The data on those sites can then be extracted using the extraction templates.

An automatic extraction system can use the user created templates to automatically extract the data from the web site and then add the automatically extracted data to the socially curated website's index for other users to view and copy to their collections.

In addition to adding product information to the user's collection from third party sites (external products), the user can also add product information from the product search engine index/database which is connected to and part of the social network by going to a product page, clicking on add to collection, and selecting a collection to add the product to (internal product). The product will be added to the user collection and can be viewed via the user's profile page. Internal and external products can be mixed and matched in the user collections. A distinction is made between internal and external products on the user pages using an internal or external label on products. External products in collections can be associated with a canonical data record from the search engine database/index either manually by the user or automatically by the search engine normalization engine. Collections from users can be displayed in a global list viewable by the world unless otherwise restricted to a specific user list or group(s) by the user. The collections can be searched and listed in a search result format. The collections can be sorted by date, popularity (voting), size, and other criteria.

The user creates lists which display data records from either external websites or the site's internal database, are shown on the users pages at the site. In this embodiment the list of data record lists is accessed from the user profile page. Each list is accessed via a URL which links to a page which shows the data records in the list, clicking on a picture shows the view with a left hand control panel with left and right arrows and a larger picture of the item selected from the previous page in the right column. Alternatively the data records can be displayed using an on demand or "lazy loading" mechanism which is activated by the user pulling down the scroll bar or clicking in the empty part of the scrollbar. In a further alternate implementation clicking on the data record in the list opens a new page dedicated to the product record.

Users can receive points for adding to their collections, creating collections, commenting on other collections, voting on items in a collection or other collections, asking questions and answering questions, joining groups that have collections, adding collection(s) to a group or their own profile. The points can be used for game mechanics to rank the users on the site and reward the users according to rank or achievement.

Trends can be determined by analyzing the types of goods, brands, and product categories users are adding to their collections. Brand managers are interested in tracking the product and brand interests of users. Brands can obtain valuable information by analyzing this information and by interacting with users on a social network where product information has been retrieved from third party sites.

Users on the social network can do any of the following actions to collections or items in collections such as add comments to a collection item or to a collection, make suggestions, and vote/rank items in a collection. Voting is used to rank the collections and ranked collections for all users are then displayed on a web page. User can ask questions about an item and the social network servers can direct the question to users that have added the item to their collections. Users can use the extracted information in conjunction with purchase and store information to track the purchase date, last return date, warranty period, and other purchase related information. Users can create groups of products that complement one another such as a dress, belt, and shoes or the components in a custom built personal computer. They can also add the item to one of their collections. Users can give feedback about items either using free form text answers, multiple choice, or can select sentence completion answers. Users can assign permission level to a collection: world group(s), or personal.

Users can create collections to inform friends and relatives about the items that they want purchased for an occasion or brought to a party or wedding or other special occasion. Users can create "do not buy collections" to warn other users about bad, unreliable or faulty products. Users can form groups around one or more collections to discuss, learn about/educate, trouble shoot, and for other purposes. Users can follow other user's collections. When a new piece of information (e.g. a new internal or external product, a user comment, a new follower, etc.) is added to the collection, the follower can elect to receive or the system can generate a message to the follower about the collection and information that was added to the collection. Users collect items from around the web or social network and combine them in a set of items with a higher utility value than they have as separate items.

Users can submit items to their collections directly from their cell phone or mobile device, including scanning the bar code for the item, or using the GPS location of the store to give feedback about the purchase of the item and the location of the purchase, as well as feedback on the shopping experience at the store and other opinions about the physical store or personnel or store policies. This information about the store can be added to the user curated data about the store on the social networking site. Additional information from the purchase can be captured by photographing the receipt for the purchase or scanning the bar code of the purchase using a mobile device and then uploading it to a collection for future use. This additional product purchase information can be added to the user curated lists. Once the data has been added to the user lists the user can add user alerts to the individual products or a single or all collections. The alerts include number of days to the last day to return an item, number of days to the last day for a warranty repair.

The website can maintain a system which tracks the store and manufacturer policies with respect to returns, repairs, and exchanges. This system can be used to push the relevant policies to the user collection data records to enable an alert system described above. The store and manufacturer policy system can be populated either by the stores and manufacturers or by users via a form on the website or mobile application.

Users may also desire to track other information related to the product such as the store the item was purchased from, the date, the store's and manufacturer's warranty policies, the store's return policy, the serial number of the item, and any other information related to returning or obtaining a warranty repair or exchange for a product.

Note that the use of products does not limit the current invention to structured product data. The present invention can be used to extract information from any type of web page which contains structured information such as financial, sports, and political data. Capturing any kind of structured information from web pages and real world events and storing them in user curated lists is an application of the describe invention. For example, similar information can be tracked for other activities such as movies. The movie ticket can be scanned, the location of the theater can be noted, the data and time of the event can be recorded, the cost of the ticket can be recorded, etc.

It is understood by those skilled in the state of the art that the widget can be a browser bookmarklet, a browser extension or some other method that allows a user to execute the widget functionality on a remote site.

Information from the User database which is the part of the website shopping engine can be viewed on Admin panel.

Optionally, the server system can check, clean, verify, classify, and normalize the data records which are stored in user lists. The extracted external data records in the user lists are matched against canonical data records in the normalized database. An extracted external data record in a user list is then put in a list in the normalized database so that there is relationship between the normalized record and the extracted external data records. The relationship between the normalized record and the extracted external data record is also stored in the user list.

If the page contains a hidden data record, that mirrors the visible product information in a product web page, either a previously created widget template can be retrieved from the template database or the user can create a new template. The template is then used in conjunction with the Javascript extraction engine to extract the hidden product record.

Additional product information such as specifications, reviews, features and descriptions may be transmitted to the server to be added to the user's collection.

The widget template creation process identifies the rich attributes which are usually stored in repeating patterns such as a table or list and extracts them from the page.

The automatic extraction process then extracts the rich attributes from the repeating patterns on each page and stores the data record in the database. A user navigates to a remote website using a browser, clicks on the widget, identifies a single repeating pattern element or name value pair, associates it with a data field name or specification attribute name, stores the XPATH, data field name or specification attribute name, data field value or specification attribute value, and the automatic extraction process identifies the set of associated repeating patterns and extracts the repeating patterns from the pages with the same structural layout and stores the extracted repeating pattern in a data record.

Data tables contain different values for different sizes of the same item. In the case of multiple specification values for a single product such as a bicycle frame the data table may contain a header or a left hand column which contains the data field names or values. The user can highlight the header or the left hand column and select data table header or data table left column and associate the header or column with a set of data field names. The data field names can be associated by selecting each individual element of the table header or left column. The user can then select the data portion of the data table. The widget then has the three pieces of information for the data table template. The location of the data field name header or column, the names of the data field names and their associated canonical names, and the data field value columns or rows. The table can then be extracted by a server side process. The advantage of the data table extraction process is that in the example above bicycle frames from different manufacturers can be compared at different sizes (e.g. 56 cm, 58 cm, 60 cm) using the exact specifications for the frame size that the customer is interested in.

Storing extracted data records. The extracted images and/or data records can be stored on a content delivery network offered by a 3rd party service such as Amazon Web Services. In one embodiment of the present invention, automatic cleaning of extracted data and automatic extraction of repeating patterns such as specifications, features is performed at the server and not at the remote web site.

Example Computing System

Figure 8:
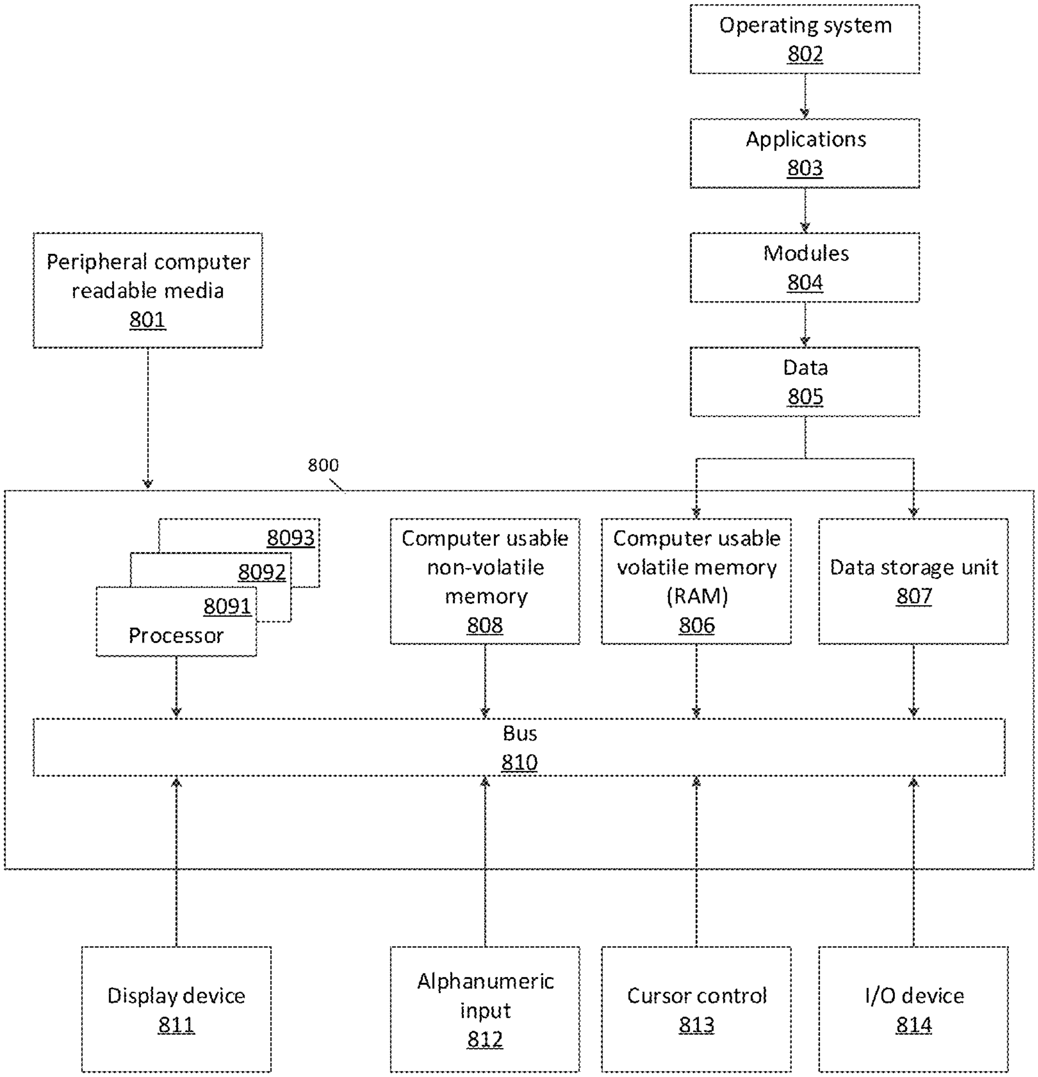
FIG. 8 is a block diagram of a computer system.

With reference now to FIG. 8, portions of the technology for providing computer-readable and computer-executable instructions that reside, for example, in or on computer-usable media of a computer system. That is, FIG. 8 illustrates one example of a type of computer that can be used to implement one embodiment of the present technology.

Although computer system 800 of FIG. 8 is an example of one embodiment, the present technology is well suited for operation on or with a number of different computer systems including general purpose networked computer systems, embedded computer systems, routers, switches, server devices, user devices, various intermediate devices/artifacts, standalone computer systems, mobile phones, personal data assistants, and the like.

In one embodiment, computer system 800 of FIG. 8 includes peripheral computer readable media 802 such as, for example, a floppy disk, a compact disc, and the like coupled thereto.

Computer system 800 of FIG. 8 also includes an address/data bus 804 for communicating information, and a processor 806A coupled to bus 804 for processing information and instructions. In one embodiment, computer system 800 includes a multi-processor environment in which a plurality of processors 806A, 806B, and 806C are present. Conversely, computer system 800 is also well suited to having a single processor such as, for example, processor 806A. Processors 806A, 806B, and 806C may be any of various types of microprocessors. Computer system 800 also includes data storage features such as a computer usable volatile memory 808, e.g. random access memory (RAM), coupled to bus 804 for storing information and instructions for processors 806A, 806B, and 806C.

Computer system 800 also includes computer usable non-volatile memory 810, e.g. read only memory (ROM), coupled to bus 804 for storing static information and instructions for processors 806A, 806B, and 806C. Also present in computer system 800 is a data storage unit 812 (e.g., a magnetic or optical disk and disk drive) coupled to bus 804 for storing information and instructions. Computer system 800 also includes an optional alpha-numeric input device 814 including alpha-numeric and function keys coupled to bus 804 for communicating information and command selections to processor 806A or processors 806A, 806B, and 806C. Computer system 800 also includes an optional cursor control device 816 coupled to bus 804 for communicating user input information and command selections to processor 806A or processors 806A, 806B, and 806C. In one embodiment, an optional display device 818 is coupled to bus 804 for displaying information.

Referring still to FIG. 8, optional display device 818 of FIG. 8 may be a liquid crystal device, cathode ray tube, plasma display device or other display device suitable for creating graphic images and alphanumeric characters recognizable to a user. Optional cursor control device 816 allows the computer user to dynamically signal the movement of a visible symbol (cursor) on a display screen of display device 818. Implementations of cursor control device 816 include a trackball, mouse, touch pad, joystick or special keys on alphanumeric input device 814 capable of signaling movement of a given direction or manner of displacement. Alternatively, in one embodiment, the cursor can be directed and/or activated via input from alphanumeric input device 814 using special keys and key sequence commands or other means such as, for example, voice commands.

Computer system 800 also includes an I/0 device 820 for coupling computer system 800 with external entities. In one embodiment, I/0 device 820 is a modem for enabling wired or wireless communications between computer system 800 and an external network such as, but not limited to, the Internet. Referring still to FIG. 8, various other components are depicted for computer system 800. Specifically, when present, an operating system 822, applications 824, modules 826, and data 828 are shown as typically residing in one or some combination of computer usable volatile memory 808, e.g. random access memory (RAM), and data storage unit 812. However, in an alternate embodiment, operating system 822 may be stored in another location such as on a network or on a flash drive. Further, operating system 822 may be accessed from a remote location via, for example, a coupling to the Internet. In one embodiment, the present technology is stored as an application 824 or module 826 in memory locations within RAM 808 and memory areas within data storage unit 812.

Exemplary System Architecture of the Invention

Figure 9:
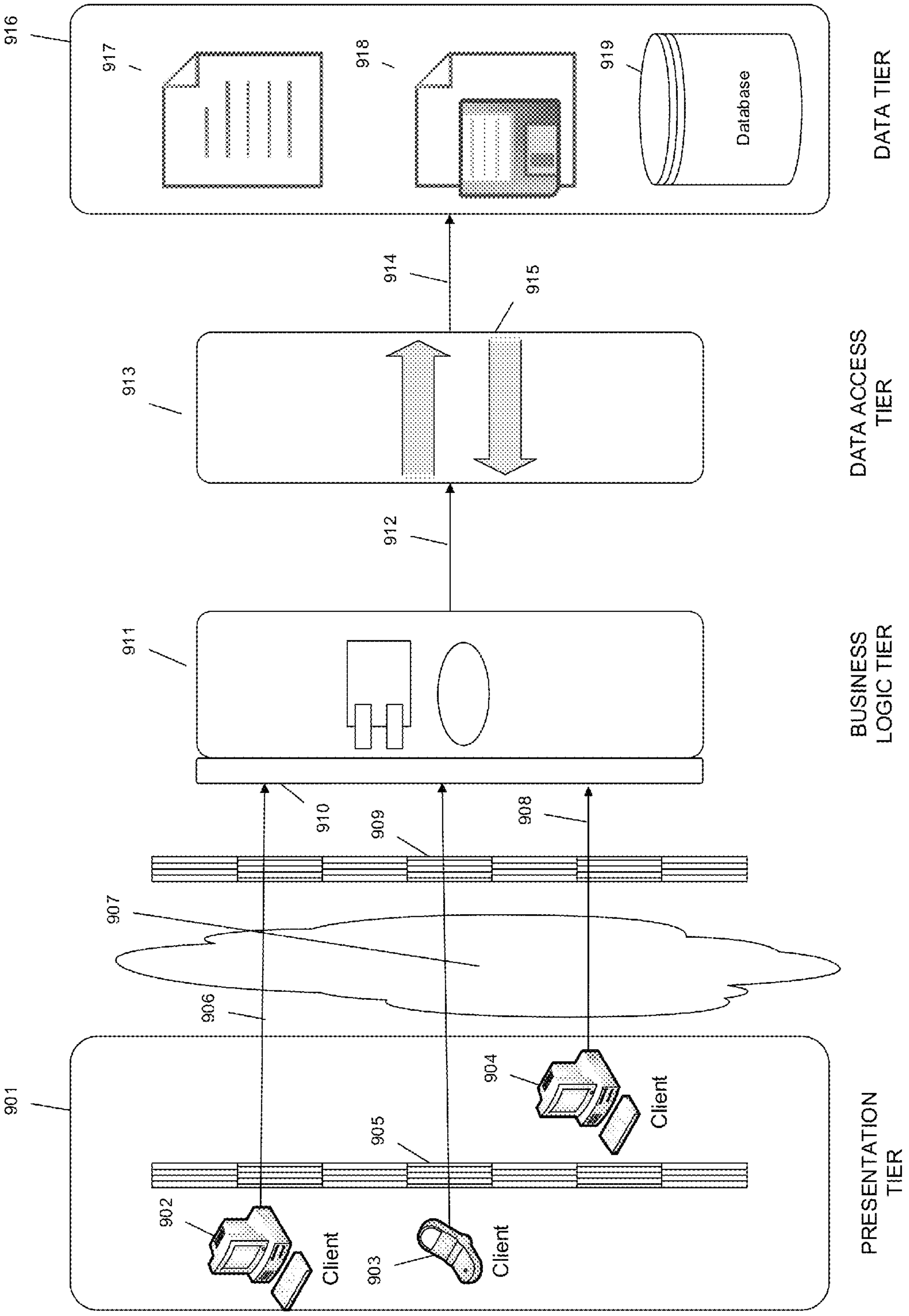
FIG. 9 is a block diagram of a distributed system.

An exemplary system architecture of the invention is described below in connection with FIG. 9. According to an embodiment of the present invention, the system may be comprised at least in part of off-the-shelf software components and industry standard multi-tier (a.k.a. "n-tier", where "n" refers to the number of tiers) architecture designed for enterprise level usage. One having ordinary skill in the art will appreciate that a multitier architecture includes a user interface, functional process logic ("business rules"), data access and data storage which are developed and maintained as independent modules, most often on separate computers.

According to an embodiment of the present invention, the system architecture of the system comprises a Presentation Logic Tier 910, a Business-Logic Tier 915, a Data-Access Tier 920, and a Data Tier 925.

The Presentation Logic Tier 910 (sometimes referred to as the "Client Tier") comprises the layer that provides an interface for an end user into the application (e.g., session, text input, dialog, and display management). That is, the Presentation Logic Tier 910 works with the results/output 960, 962 of the Business Logic Tier 915 to handle the transformation of the results/output 960, 962 into something usable and readable by the end user's client machine 930, 935, 985. Optionally, a user may access the using a client machine 930 that is behind a firewall 970, as may be the case in many user environments.

The system uses Web-based user interfaces, which accept input and provide output 960, 962 by generating web pages that are transported via the Internet through an Internet Protocol Network 980 and viewed by the user using a web browser program on the client's machine 930, 935. In one embodiment of the present invention, device-specific presentations are presented to mobile device clients 985 such as smartphones, PDA, and Internet-enabled phones. In one embodiment of the present invention, mobile device clients 985 have an optimized subset of interactions that can be performed with the system, including browsing campaigns, searching campaigns, and sponsoring campaigns. In one embodiment of the invention, mobile device clients 985 can share campaigns on social media, email, or text messaging from the mobile device.

According to an embodiment of the present invention, the Presentation Logic Tier 910 may also include a proxy 975 that is acting on behalf of the end-user's requests 960, 962 to provide access to the Business Logic Tier 915 using a standard distributed-computing messaging protocol (e.g., SOAP, CORBA, RMI, DCOM). The proxy 975 allows for several connections to the Business Logic Tier 915 by distributing the load through several computers. The proxy 975 receives requests 960, 962 from the Internet client machines 930, 935 and generates html using the services provided by the Business Logic Tier 915.

The Business Logic Tier 915 contains one or more software components for business rules, data manipulation, etc., and provides process management services (such as, for example, process development, process enactment, process monitoring, and process resourcing).

In addition, the Business Logic Tier 915 controls transactions and asynchronous queuing to ensure reliable completion of transactions, and provides access to resources based on names instead of locations, and thereby improves scalability and flexibility as system components are added or moved. The Business Logic Tier 915 works in conjunction 966 with the Data Access Tier 920 to manage distributed database integrity.

Optionally, according to an embodiment of the present invention, the Business Logic Tier 915 may be located behind a firewall 972, which is used as a means of keeping critical components of the system secure. That is, the firewall 972 may be used to filter and stop unauthorized information to be sent and received via the Internet-Protocol network 980.

The Data-Access Tier 920 is a reusable interface that contains generic methods 945 to manage the movement 967 of Data 950, Documentation 952, and related files 951 to and from the Data Tier 925.

The Data Tier 925 is the layer that contains the Relational Database Management System (RDBMS) 950 and file system (i.e., Documentation 952, and related files 951) and is only intended to deal with the storage and retrieval of information. The Data Tier 925 provides database management functionality and is dedicated to data and file services that may be optimized without using any proprietary database management system languages. The data management component ensures that the data is consistent throughout the distributed environment through the use of features such as data locking, consistency, and replication. As with the other tiers, this level is separated for added security and reliability.

The present technology may be described in the general context of computer-executable instructions stored on computer readable medium that may be executed by a computer. However, one embodiment of the present technology may also utilize a distributed computing environment where tasks are performed remotely by devices linked through a communications network.

It is to be understood that the exemplary embodiments are merely illustrative of the invention and that one skilled in the art may devise many variations of the above-described embodiments without departing from the scope of the invention. It is therefore intended that all such variations be included within the scope of the following claims and their equivalents.

What is claimed is:

1. A method for extracting structured data from a web page using a web browser device, said method comprising:

a first user accessing said web page with a web browser, wherein the web page displays a product and a plurality of data field values, wherein the web page belongs to a web site;

the first user activating said web browser device, wherein the browser device comprises at least one of a widget, a button, or a browser extension;

the first user manually choosing and selecting a first data field value from the plurality of data field values;

the first user manually associating a first data field name with said first data field value using a menu;

automatically associating a widget data field name with said first data field name;

calculating an XPATH value of said first data field value on said web page, wherein a widget extraction engine calculates the XPATH value from a root of the web page markup to a data item corresponding to the first data field value;

creating, using said web browser device, a template comprising said widget data field name, a data element type corresponding to the first data field value, a boolean if the first data field value is a constant and should not be extracted, and if constant, a substitute data value to substitute for a corresponding page value in future extractions of corresponding page layout type from the web site, and said XPATH value;

selecting elements of an attribute list with name value pairs and XPATH values associated with a data record to identify a repeating structured pattern associated with said attribute list with name value pairs and XPATH values, wherein the widget extraction engine calculates the XPATH values from the root of the markup page to data items corresponding to the elements;

storing said template in a first data store with a key, wherein the key is a root URL for the web site corresponding to the web page;

storing said first data field value and said first data field name in a second data store wherein there is an association between the first data field name in said first data store and said second data store;

converting said template from said first data store into an automatic data extraction template to extract current data field values from all web pages at the web site which match said template;

cleaning said first data field value, classifying said first data field value, normalizing said first data field value, storing said first data field value and indexing said first data field value;

automatically extracting a structured data record from a web page using the automatic data extraction template;

adding said structured data record to a user profile on a social network; and sharing said structured data record with a plurality of users wherein each of said plurality users can comment, copy, vote on, or access an original structured data record source.

2. The method of claim 1 further comprising displaying a first data field value in said web browser device.

3. The method of claim 1 further comprising checking validity of said template by re-extracting a current data field value and comparing to said first data field value.

4. The method of claim 1 further comprising the user marking the first data value as a constant wherein said constant becomes part of the template, and said constant is displayed in subsequent extraction processes.

5. The method of claim 1 further comprising storing said first data field value with said first data field name and said XPATH value in said first data store.

6. The method of claim 1 further comprising associating the root URL with one or more of said templates and storing said association in said first data store.

7. The method of claim 1 further comprising classifying said first data field value using a product classifier and assigning a product classification to said first data field value.

8. The method of claim 1 further comprising aggregating a plurality of data field names and data field values in said second data store into user defined collections.

9. The method of claim 1 further comprising associating a plurality of templates for measuring the quality and quantity of templates generated by said first user.

10. The method of claim 1 further comprising installing said web browser device in said web browser wherein said web browser does not have said web browser device installed.

11. The method of claim 1 further comprising a second user accessing said web page from which said template was created to retrieve said template to extract a current data field value from said web page.

12. The method of claim 11 further comprising a third user accessing said web page from which said template was created to retrieve said template to extract a current data field value from a third web page.

13. The method of claim 1 further comprising extracting all of the elements of an attribute list with name value pairs, and XPATH values associated with said data record using a repeating structured pattern associated with said attribute list with name value pairs and XPATH values.

14. The method of claim 1 wherein said web browser device is embedded in said web page.

15. The method of claim 14 further comprising selecting said first field value using a predefined template retrieved from said first data store.

16. The method of claim 14 further comprising selecting said first field value by searching for a predefined data field name on said web page.

17. The method of claim 1 further comprising adding date and purchase location information associated with said first field value to said second data store.

18. The method of claim 1 further comprising comparing a plurality of data field values from said second data store by a user in a social network or shopping engine and storing the comparison for viewing by said user or other social network members.

19. The method of claim 1 further comprising combining said data record with a plurality of other extracted data records to form collections.

20. The method of claim 19 further comprising voting on one or more said extracted structured data records in said collection.

21. The method of claim 19 further comprising combining multiple said extracted structured data records of said collection to form a useful kit.

22. The method of claim 19 further comprising storing said collection in a searchable index.

23. An apparatus implementing a browser based information transmission method for extracting structured data from a web page using a web browser device, the apparatus comprising:

a processor;

memory storing computer program instructions executed by the processor;

input devices and the computer program instructions executed by the processor configured for allowing:

a first user accessing said web page with a web browser, wherein the web page displays a product and a plurality of data field values, wherein the web page belongs to a web site;

the first user activating said web browser device, wherein the browser device comprises at least one of a widget, a button, or a browser extension;

the first user manually choosing and selecting a first data field value from the plurality of data field values;

the first user manually associating a first data field name with said first data field value using a menu;

the computer program instructions executed by the processor further configured to:

automatically associate a widget data field name with said first data field name;

calculate an XPATH value of said first data field value on said web page, wherein a widget extraction engine calculates the XPATH value from a root of the web page markup to a data item corresponding to the first data field value;

create, using said web browser device, a template comprising said widget data field name, a data element type corresponding to the first data field value, a boolean if the first data field value is a constant and should not be extracted, and if constant, a substitute data value to substitute for a corresponding page value in future extractions of corresponding page layout type from the web site, and said XPATH value;

select elements of an attribute list with name value pairs and XPATH values associated with a data record to identify a repeating structured pattern associated with said attribute list with name value pairs and XPATH values, wherein the widget extraction engine calculates the XPATH values from the root of the markup page to data items corresponding to the elements;

store said template in a first data store with a key, wherein the key is a root URL for the web site corresponding to the web page;

store said first data field value and said first data field name in a second data store wherein there is an association between the first data field name in said first data store and said second data store;

convert said template from said first data store into an automatic data extraction template to extract current data field values from all web pages at the web site which match said template;

clean said first data field value, classifying said first data field value, normalizing said first data field value, storing said first data field value and indexing said first data field value;

automatically extract a structured data record from a web page using the automatic data extraction template;

add, and store in non-volatile memory, said structured data record to a user profile on a social network; and share said structured data record with a plurality of users wherein each of said plurality users can comment, copy, vote on, or access an original structured data record source.

* * * * *